United States Patent [19]
Leon et al.

[11] Patent Number: 5,832,461
[45] Date of Patent: Nov. 3, 1998

[54] SYSTEM AND METHOD OF INVESTMENT MANAGEMENT INCLUDING MEANS TO ADJUST DEPOSIT AND LOAN ACCOUNTS FOR INFLATION

[75] Inventors: Tomas Leon; Lewis J. Spellman, both of Austin, Tex.

[73] Assignee: Trans Texas Holdings Corporation, Austin, Tex.

[21] Appl. No.: 780,834

[22] Filed: Oct. 23, 1991

Related U.S. Application Data

[63] Continuation of Ser. No. 187,054, Apr. 27, 1988, abandoned, which is a continuation of Ser. No. 770,493, Aug. 27, 1985, Pat. No. 4,742,457.

[51] Int. Cl.$^6$ .................................................. G06F 17/60
[52] U.S. Cl. ............................................. 705/38; 705/35
[58] Field of Search ............................. 364/401, 406, 364/408; 705/1, 35, 36, 38, 39, 40, 30, 34, 42, 44

[56] References Cited

U.S. PATENT DOCUMENTS

| 4,194,242 | 3/1980 | Robbins et al. | 705/38 |
| 4,232,367 | 11/1980 | Youden et al. | 705/38 |
| 4,321,672 | 3/1982 | Braun et al. | 705/42 |
| 4,346,442 | 8/1982 | Musmanno | 705/36 |
| 4,376,978 | 3/1983 | Musmanno | 705/36 |

OTHER PUBLICATIONS

Humphrey, Thomas M., "The Concept of Indexation in the History of Economic Thought," *Federal Reserve Bank of Richmond, Economic Review*, pp. 3–16 (Nov./Dec. 1974).

Brenner, Menachem and Galai, Dan, "The Determinants of the Return of Index Bonds," *Journal of Banking and Finance 2*, pp. 47–64 (1978).

Fischer, Stanley, "Call Option Pricing When the Exercise Price is Uncertain, and the Valuation of Index Bond," *The Journal of Finance, vol. XXXIII. No. 1*, pp. 169–176 (Mar. 1978).

Fischer, Stanley, "Indexation in the Capital Markets," *Indexing Inflation, and Economic Policy*, pp. 263–356 (1986).

Munnell, Alicia H. and Grolnic, Joseph B., "Should the U.S. Government issue Index Bonds?," *New England Economic Review*, pp. 3–21 (Sep./Oct. 1986).

Peled, Dan, "Stochastic Inflation and Government Provision of Indexed Bonds," *Journal of Monetary Economic 15*, pp. 291–308 (1985).

Shen, Pu, "Benefits and Limitations of Inflation Indexed Treasury Bonds," *Federal Reserve Bank of Kansas City, Economic Review*, pp. 41–55 (Third Quarter 1995).

Wilcox, James A., "Inflation–Proof Long–Term Bonds," *Federal Reserve Bank of San Francisco, FRBSF Weekly Letter* (Nov. 30, 1984).

(List continued on next page.)

*Primary Examiner*—Stephen R. Tracs
*Attorney, Agent, or Firm*—Arnold, White & Durkee

[57] ABSTRACT

Data processing for novel form of relationship management links, supervises, and balances depositors, marketing agents, financial intermediaries, mortgage brokers, and borrowers in an inflation-adjusted financing program. Funds are deposited in participating financial institutions in return for certificates of deposit yielding a fixed rate of interest, plus principal growth at a yearly rate equal to that year's rate of growth in the Consumer Price Index-All Urban Consumers, All Items. Funds on deposit are loaned to borrower, either directly or through brokers, at a rate calculated by adding three components: a fixed debt service rate, a fixed constant interest rate, and an inflation factor interest rate which reflects the effects of inflation on the outstanding loan balance. Organizing company sychronizes entire program by contacting depositors through marketing agent, designating institutions to receive depositors' funds, contacting borrowers directly or through brokers, and by supplying data processing capabilitites to financial intermediaries for purposes of impletation of the program and for analysis of the effects of the program on the intermediaries' capital structures.

44 Claims, 8 Drawing Sheets

OTHER PUBLICATIONS

"Hearing before the Subcommitte on Trade, Productivity, and Economic Growth of the Joint Economic Committee, Congress of the United States Ninety–Ninth Congress, First Session," *Inflation Indexing of Government Securities* (May 14, 1985).

Page, S. A. B. and Trollope, Sandra, "An International Survey of Indexing and Its Effects," *National Institute Economic Review; No. 70,* pp. 46–60 (Nov. 1974).

Bottle, Roger, "Index–linked gilts, A practical investment guide," (1985).

Price, Robert, "The Rationale and Design of Inflation–Indexed Bonds," *International Monetary Fund* (Jan. 1977).

Barnett and McKenzie (1984) "Mortgages with Indexed Principals" *Alternative Mortgage Instruments.*

Weiner, S.E. (1983) Why Are So Few Financial Assets Indexed to Inflation, Economic Review, Financial Reserve Bank Of Kansas City, pp. 3–18.

Sharplin, A.D. (Aug. 1983) "Indexed Lendings", *Mortgage Banking* pp. 57–63.

Sharplin, A.D. (Nov. 1982), "Indexed Mortage Pass–Throughs," *Pension World,* pp. 30–32.

McCulloch, J.H. (Sep. 1982), "Affordability and Inflation Protection," *Mortgage Banking,* pp. 8–13.

Wurtzeback, C.H. and Waller, N.G. (1985), "Duration: A Powerful New Tool for Managing Interest Rate Risk," *Real Estate Review,* 15:66–69.

Ranson, D. (Jul. 8, 1985), "Interest Rates Aren't Really High," *Fortune,* pp. 147–148.

SYSTEM AND METHOD OF INVESTMENT MANAGEMENT INCLUDING MEANS TO ADJUST DEPOSIT AND LOAN ACCOUNTS FOR INFLATION

This is a Continuation of application Ser. No. 07/187,054 filed Apr. 27, 1988, now abandoned, which in turn is a Continuation of application Ser. No. 770,493, filed Aug. 27, 1985, now U.S. Pat. No. 4,742,457.

BACKGROUND OF THE INVENTION

1. Field of the Invention

This invention relates to financial management systems and, more specifically, to data processing methodology for effecting an improved capital structure in financial institutions.

2. Description of the Prior Art

A number of financial management systems have been proposed in the past. Exemplary systems include U.S. Pat. Nos. 4,194,242; 4,232,367; 4,321,672; 4,346,442 and 4,376,978. However, such prior systems address substantially different problems and accordingly, are substantially different from the inflation-adjusting program of the present invention.

During times of inflation, lenders and borrowers, whether they be institutions or individuals, must anticipate what the effects of inflation will be on the cash flow characteristics of a loan. Investors face a similar uncertainty. Traditionally, lenders compensate for this uncertainty by including a premium in the interest rate charged on the loan. This premium represents what the lender feels will be the level of inflation during the term of the loan.

Loans which include a fixed inflation compensation factor are not immune to the effects of inflation. For example, when a lender anticipates a 6% annual inflation over the life of a loan and the actual average inflation turns out to be 10%, the lender has realized a 4% annual loss in terms of real dollars. In addition, standard-fixed-payments loans ("SFPM's") exhibit a progressive decline with time in terms of the flow of real dollars leading to a real-payment forward "tilt" characterized by a much greater equity accumulation during the early years of an extended loan. Conventional SFPM's are particularly burdensome in an inflationary environment in that they fail to account for appreciation of the mortgaged property.

In an attempt to compensate for such an eventuality, some lenders have offered loans or mortgages which include a floating interest factor that is periodically varied in some manner to compensate for the effects of inflation. One such alternative mortgage instrument is the adjustable rate mortgage, or "ARM", which allows for periodic adjustment of payments to compensate for what the lender feels will be the inflationary effect on the loan during the upcoming period. For example, a typical ARM is indexed to a standard interest rate such as a particular bank's prime rate or six-month Treasury bill average. However, due to the fact that ARM's still reflect the market's "expectation" of the inflation rate, their inflation premiums may still not reflect the actual rate of inflation.

Two mortgage loan instruments which are directly indexed to inflation have been offered on a limited basis. One such instrument is the price-level adjusted mortgage, or "PLAM," whose mortgage balance is periodically adjusted to account for the effects of inflation during the interval since the previous adjustment. PLAM's have generally been indexed to one of the various consumer price indexes. Such indexing of the PLAM loan balance results in the deferral and capitalization of additional interest. The resulting PLAM loan serves to even out equity accumulation during the life of the mortgage in contrast to SFPM's.

Another indexed mortgage instrument is the "modified" PLAM which combines some aspects of the traditional fixed rate mortgage with those of the PLAM. In particular, the modified PLAM has a fixed interest rate which includes a specified inflation factor and, in addition, has a variable interest rate which will compensate the lender for inflation over and above the specified inflation factor.

Inflation-indexed loan instruments have advantages in that inflation risk to the lender is minimized. For example, with SFPM's during periods of inflation, the borrower realizes a windfall in terms of actual dollars where the loan rate is based on a low level of anticipated inflation. Conversely, the lender has suffered a loss in terms of real dollars. Inflation indexed loans serve to solve this problem. However, the borrower under such instruments still faces much uncertainty: when inflation spirals, so do the loan payments. If inflation operates similarly on the mortgaged or secured property, there is no loss in terms of real dollars. However, if the value of the property securing the loan does not inflate at the same rate as the loan balance, there is potentially an inflation loss.

Such problems have in the past prevented large-volume or commercial borrowers from taking advantage of inflation-indexed loans. That is, the uncertainty over whether the return on inflation-indexed borrowed funds which have been reinvested, will compensate for the "cost" of those funds. This problem of unbalanced investments and loans is seen most acutely where one wishes to invest in a manner that will assure an inflation-adjusted return on the investment. One answer would be for institutions to accept investment capital into deposit accounts which insure an inflation-adjusted return on the deposited funds. However, the risk to the lending institution is clear: such inflation-adjusted deposit accounts must in some manner be backed by inflation-adjusted dollars. Equally important, institutions engaged in lending and borrowing funds require the ability to match funds which have been obtained on an inflation-indexed basis with some similarly indexed funds which are lent out. Moreover, such institutions require the ability to assess the impact of inflation-adjusted deposit and loan accounts on their capital structure.

Accordingly, the present invention addresses these problems by providing a system for implementing inflation indexed deposit accounts, for matching such accounts with similarly indexed loan accounts and for anticipating the effects of these accounts on the existing capital structures of the institution or investor.

SUMMARY OF THE INVENTION

The foregoing and other problems of the prior art are solved by the system of the present invention which institutes inflation-adjusted deposit and loan accounts and matches such accounts to provide an improved capital structure for a financial institution. The system projects the impact of inflation-indexed deposit and loan accounts on the institution's capital structure for preselected or anticipated inflationary environments. Based on such projections and other general considerations, one of several forms of deposit accounts is selected according to the requisites of the depositor or borrower and those of the institution.

As contemplated under the present invention, the accounts are characterized by a principal component and an accrual component. Principal component is that proportion of the overall account balance attributable to the initial cash investment. The accrual component indicates that proportion of the overall account balance attributable to inflation and fixed interest. The account components are periodically enhanced or reduced in a manner specified by the characteristics of the particular account selected.

The accrual component will generally include both a fixed interest component and a variable interest component with the variable interest component being responsive to the rate of inflation. Responsive to the rate of inflation, as used herein, means directly responsive to a market indicator of prior actual inflation and it is not meant to include the market's expectation of future inflation. Under one alternative, the principal component is enhanced by the variable interest component and the account retired by retiring the fixed interest component by one schedule and retiring the principal component by a second schedule. However, the account may be retired by retiring both components over a similar schedule or by amortization. By varying the manner in which each respective component is accrued or retired, the cash flow characteristics of the account can be significantly altered to fit the requisites of the individual or institution. Cash flow is defined as the overall flow of cash units from the account, or a selected account component, to the account holder who will either be the lender or depositor, at a specified time.

Since the accrual component of either loan or deposit accounts may be adjusted in response to inflation, they can potentially exhibit unfavorable cash flows. Therefore, it is generally desirable to match loan accounts with deposit accounts, and further generally desirable to match accounts with similar intrinsic cash flow characteristics as specified by their accrual and retirement features. In this manner, cash flow patterns of the loan account would mirror those of the matched deposit account. Thus, during times of inflation, for example, negative cash flows attributable to outgoing retirement payments on deposit accounts will be compensated for by incoming payments on loan accounts.

Once the appropriate form of deposit and loan accounts are selected, matched and placed with the institution, data processing is utilized to service them during their respective terms. As referred to herein, the account term is the time period over which the account is retired or "paid out" to the account holder. The account term is generally divided into a plurality of adjustment or iteration periods, however, terms may be scheduled to include only a single iteration. Servicing includes the determination of inflation adjustments to the account balance or, alternatively, the inflation premium due the account holder. Servicing also includes features which protect the principal or balance of the accounts from the effects of deflation and reports all bookable income to holder.

Servicing further includes data processing for retiring and enhancing the accounts according to their respective terms and schedules. Retirement is meant to include a reduction in the particular account component and enhancement is meant to include an increase or accrual of the particular account component. For example, accrual components may be retired separately from the principal component by selecting separate schedules for each. Thus, for example, the principal may be retired semi-anually and the accrual retired annually. Schedules may be selected which adjust particular components by a predetermined amount. Alternatively, account components may be retired by amortization.

DETAILED DESCRIPTION OF THE PREFERRED EMBODIMENTS

The System

Figure 1:
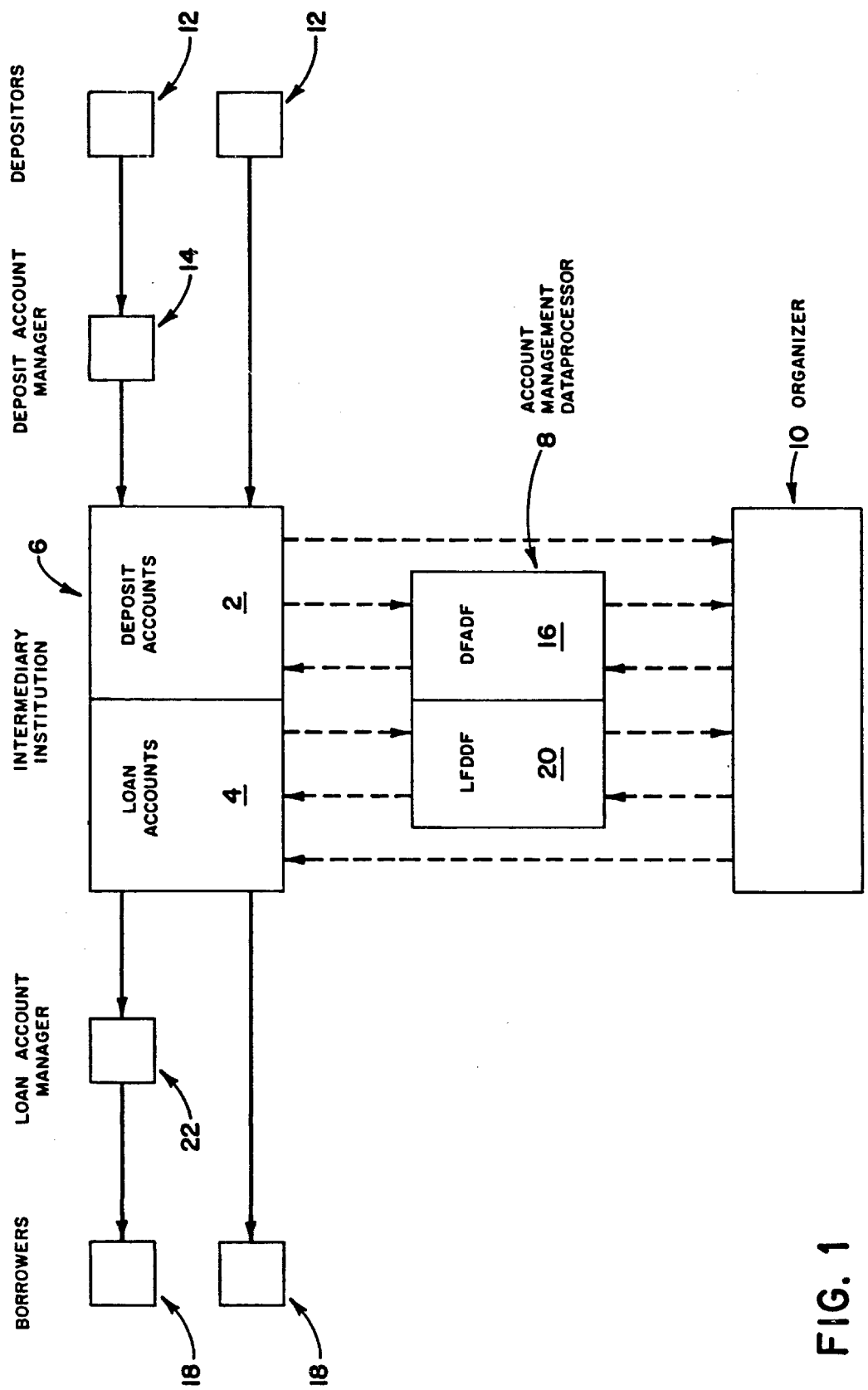
FIG. 1 is an overall schematic view of the inflation-adjusting account management system of the present invention.

Referring now to FIG. 1, there is shown in overall scope an operational flow chart for implementing the deposit/loan inflation-adjusting system of the present invention. As therein depicted, the broad aspects of the system include an inflation-adjusted deposit account 2, an inflation-adjusted loan account 4, an intermediary institution 6 and an account management dataprocessor 8.

In the most basic embodiment of the present invention, the intermediary institution 6 receives deposited funds in deposit accounts 2 and lends funds through loan accounts 4. Retirement of these inflation-adjusted accounts are implemented by account management dataprocessor 8. Such data processing services the inflation-adjusting accounts in a number of ways, including the determination of their cash flow characteristics in changing inflationary environments and determining the anticipated effects of inflation on the account balance. Characteristics of the individual accounts are tailored to meet the needs of the particular depositor.

However, as illustrated in FIG. 1, the system of the present invention need not be limited to the three above mentioned fundamental aspects. In a preferred embodiment, an organizing company 10 acts as a synchronizer by contacting depositors 12 through intermediary 6 or through a marketing agent 14, for example, a pension fund manager. Depositor characteristics are listed on a Deposit Funds Available Data File 16 ("DFADF"), wherein characteristics listed include a depositor identifier, the amount of funds available, the term of the account, the duration of the account, the type of account and the account retirement schedule. The amount of funds available is the total amount of funds sought to be deposited by the depositor. The term of the account is the length of time from the initial deposit until maturity (i.e., when the account has been entirely retired). The duration of the account, explained more fully below, is a mathematical expression of when the average time-weighted dollar is paid out of the account. The type of account, also explained in greater detail below, represents the particular accrual and retirement features of the deposit account. The retirement schedule refers to the timing of the iteration or payback periods and may include a predetermined retirement amount where appropriate.

Characteristics of borrowers 18 are similarly listed in a Loan Funds Desired Data File 20 ("LFDDF"), which includes the amount of funds sought to be borrowed, the term of years for which the funds are desired, the duration of the loan account, the type of loan account and the loan account retirement schedule. Additional parameters such as credit rating of the borrower or capacity of the lenders are generally included in the LFDDF or DFADF. Capacity represents the total funds the lending institution may wish to devote to particular categories of loan transactions, for example, commercial development loans.

Data processing capabilities are supplied for displaying and choosing the particular inflation-indexed account characteristics and for servicing the accounts once installed. Organizing company 10 may also act as a matching agent to receive deposit commitments from depositors 12 or marketing agent 14 and place such commitments with intermediary 6 that may require inflation-indexed deposit funds to back similarly indexed mortgage loans. Again, intermediary 6 acts as the actual conduit for the passage of funds but may rely on organizer 10 to match indexed deposit contributors with borrowers and/or to service accounts 2,4 once they are installed.

Servicing the Accounts

In general, four basic types of accounts, represented by the designations Group I, II, III or IV, are contemplated under the present invention. These accounts vary in terms of their cash flow, principal repayment and interest accrual characteristics. They can be characterized as having a principal component, which initially represents the sum deposited or loaned, and an accrual component, which represents that portion of the balance that is attributable to the effects of interest, servicing fees and inflation on the principal. However, the accounts of the present invention may vary in terms of how and to what extent interest accrues, whether the interest is "payed out" or reinvested into the overall account balance, and how the account is retired over a selected term.

In their most basic embodiment, Group I accounts include those accounts wherein the fixed-interest and inflation-adjusted interest components are retired as they accrue. In Group II accounts, both the fixed and adjustable components are retained as principal and thus add to the overall account balance. In Group III and IV accounts, the fixed interest component is payed out as it accrues and the adjustable component is added to account balance. Group III and IV accounts differ in that Group IV accounts are retired by amortizing the account balance at each iteration period whereas Group III accounts are retired by a predetermined portion at each iteration period with the remaining balance being retired at the final iteration.

Figure 2:
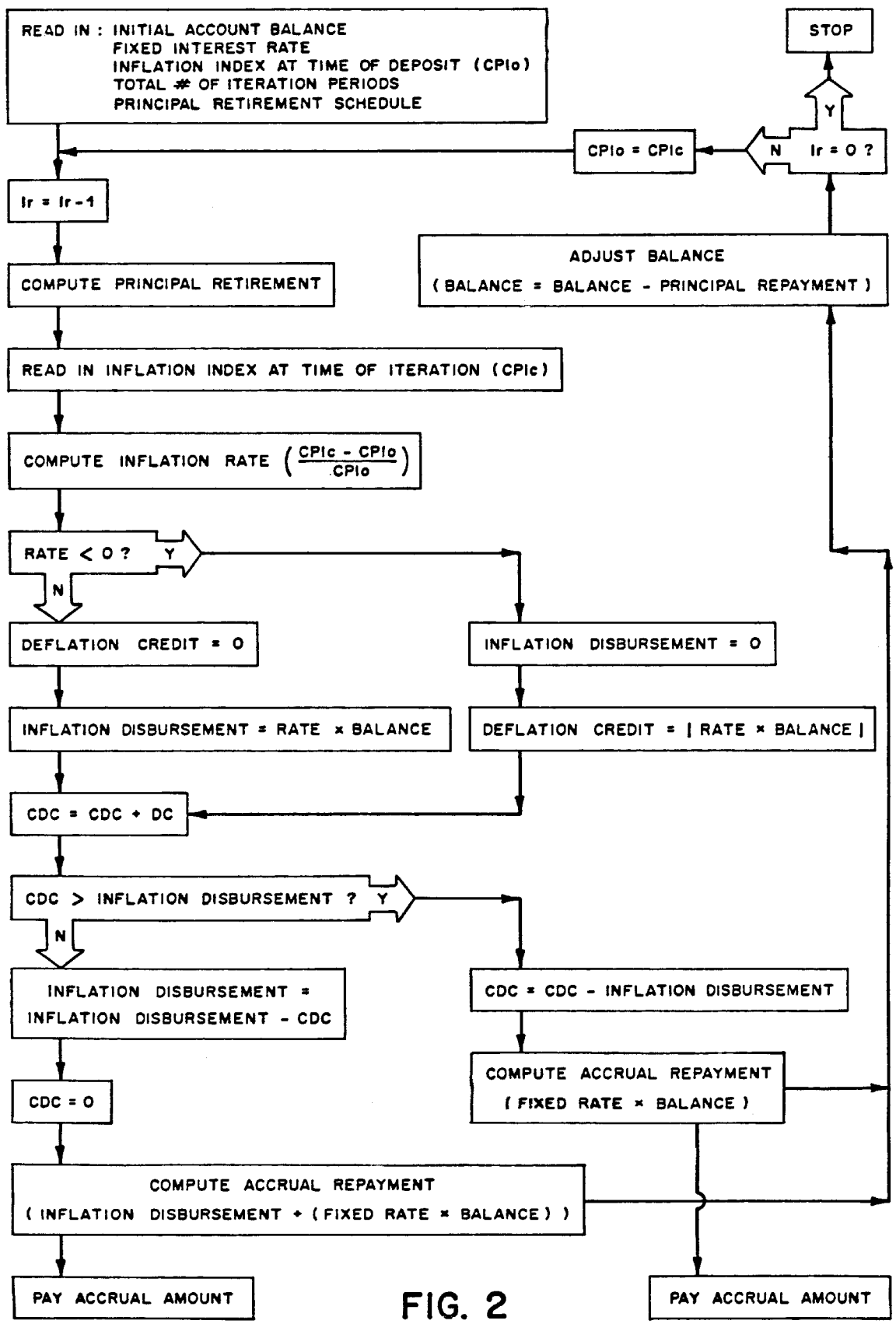
FIG. 2 is a flow diagram of the steps for servicing Group I deposit or loan accounts.

Referring to FIG. 2, is shown a flow chart, adaptable to data processing, for servicing what are referred to herein as Group I deposit or loan accounts. Group I accounts are characterized by a non-adjusted principal which is retired over a series of predetermined intervals or iterations. Alternatively, the principal may be retired in one lump sum payment at maturity. Because Group I accounts do not have adjusted principals, their accrual components are also retired at predetermined intervals over the life or term of the accounts. As with the principal retirement, the accrual component may be retired in one lump sum payment at the end of the term. Alternatively, the accrual retirement may be scheduled in a separate fashion from the principal retirement.

Generally, the Group I principal retirement schedule will consist of the retirement of the entire principal at the end of the term of the instrument. The accrual component, on the other hand, is retired as it accrues at each iteration period, and does not accumulate or enhance the principal. This results in an instrument having cash flows closely resembling those of a "conventional" certificate of deposit or bond ("conventional" referring to payment of a fixed rate of interest) with the difference that accrual payments will vary with the rate of inflation. Therefore, the cash flow characteristics of Group I accounts can be characterized generally as low during the term of instrument, with a large payment at the end. However, other principal retirement schedules are possible within the Group I framework, and cash flows could be accelerated through earlier payments of a portion of the principal.

As displayed in the flow diagram of FIG. 2, Group I accounts are serviced by first ascertaining, for example from DFADF or LFDDF, the initial balance, the fixed interest rate to be paid, the inflation index at the time of the deposit or loan, the total number of iterations or adjustment periods, and the schedules by which the principal and accrual components are to be retired. Proceeding through the flow diagram, the first operator, Ir=Ir−1, serves as a counter to determine the number of iterations remaining in the scheduled account term. The amount of the principal to be retired by cash disbursement to the account holder is determined by reference to the schedule. Once the current inflation index (CPIc) is determined, the level of inflation since the last reporting period is estimated by consideration of a preselected inflation index which reflects prior actual inflation. A preferred embodiment of the present invention utilizes the consumer price index CPI-U, for all items. However, any number of indexes may be successfully utilized including, but not limited to CPI-W, Producer Price Index, the Implicit Price Deflator for the Gross National Product, or any component of these price level measures so long as the index reflects some measure of past inflation. The level inflation which has occurred since the previous iteration period can be determined by the formula:

$$\frac{CPIc - CPIo}{CPIo}$$

Where CPIo id the inflation index at the time of the last iteration, or the initial index if the present iteration is the first.

The account servicing scheme makes the determination as to whether deflation has in fact taken place since the previous reporting period or iteration period. This test serves to protect against a possible negative cash flow which could result during deflationary periods. If deflation has taken place, no adjustment is made to the balance in response to the deflation, rather, deflation credits are stored and subsequently retired when inflation returns. Deflation credit is accumulated with deflation credit from prior iteration periods, if any, in the form of cumulative deflation credit ("CDC").

If, alternatively, inflation has occurred during the prior iteration period, the cash outflow or disbursement attributable to the effects of inflation on the account balance is determined by applying the inflation rate to the deposit balance. If the cumulative deflation credit is greater than the inflation disbursement, the CDC is reduced by that amount and the accrual disbursement to depositors is determined by applying the fixed interest rate to the principal.

If the CDC value is less than or equal to the calculated inflation disbursement factor, the disbursement factor is reduced in porportion to the CDC, if any, and the CDC set to zero. Accrual repayment is determined by applying the fixed interest rate to the balance and adding the product to the inflation disbursement factor. The account balance is adjusted to reflect both the principal and accrual retirement. Following a test to determine whether any iteration periods remain, the initial CPI (CPIo) is reset to equal the current CPI (CPIc), to allow for inflation rate determination at the next cycle.

Group II deposit accounts are characterized by a principal component that is enhanced by the accrual component. Thus, principal growth is observed on the one and and the account is retired by retiring only the principal. Since all inflation and interest adjustments on the account serve to enhance the principal, only one schedule of retirement is required. Group II accounts will generally demonstrate cash flows which do not react as quickly to rising inflation as those of Group I accounts. This is due to the fact that the accrual component of Group II accounts are not necessarily paid out in their entirety at each iteration period as in Group I accounts. Rather, the accrual is retained as principal and retired by a preselected schedule, for example, by retiring a predetermined portion at each iteration period. This results in a straight-line reduction of the account balance during the account term followed by a lump sum payment of the remaining balance at maturity. Alternatively, a schedule may be selected where the entire account is retired by one lump sum payment at maturity with no intervening retirements.

Figure 3:
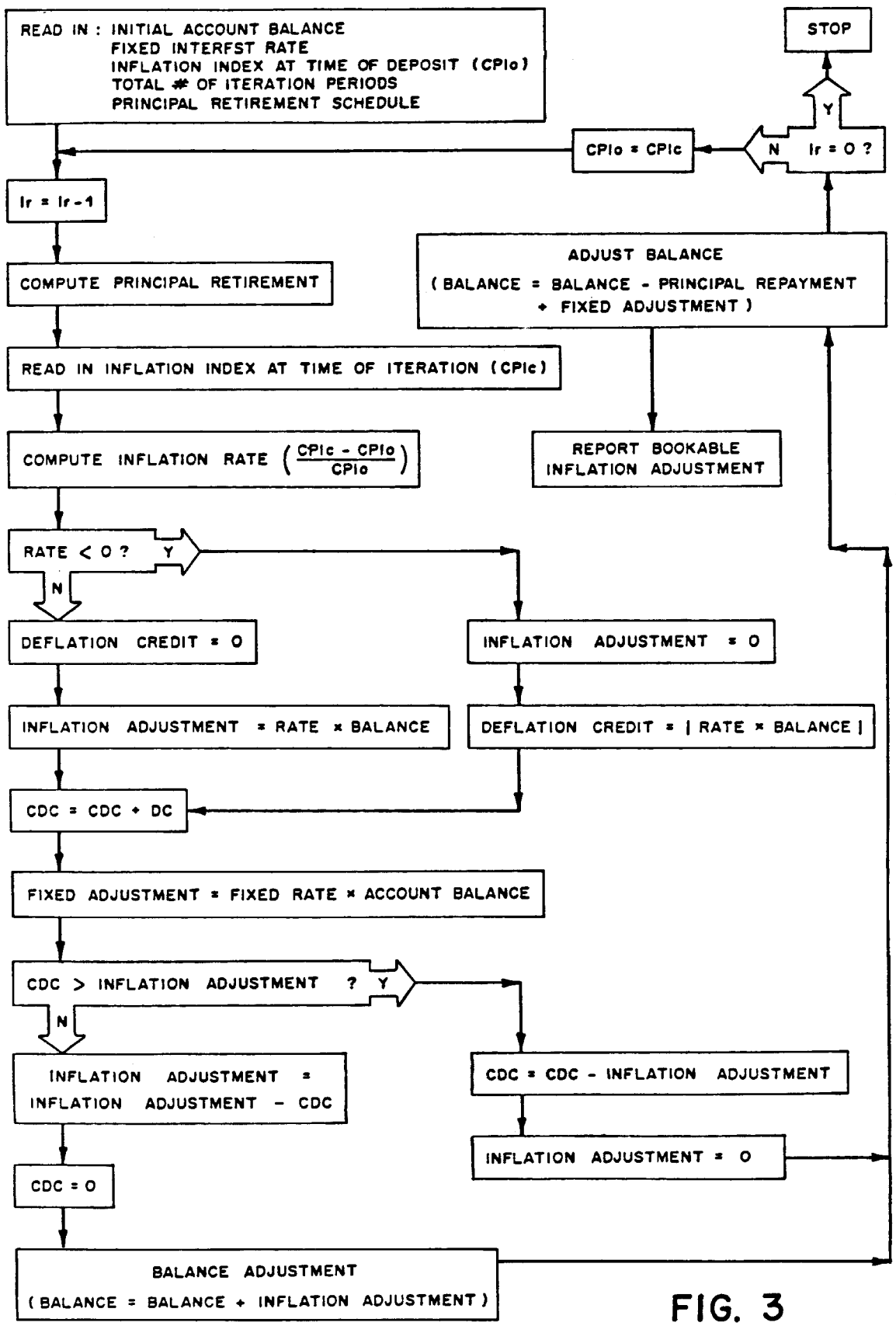
FIG. 3 is a flow diagram of the steps for servicing Group II deposit or loan accounts.

Referring now to FIG. 3, is shown a flow chart for servicing Group II accounts. As with Group I accounts, the parameters of initial account balance, fixed interest rate to be charged, the initial inflation index (CPIo), number of iteration periods, and account retirement schedules are supplied. The amount of principal to be retired is then determined by reference to the schedule. This amount is disbursed to the account holder.

The inflation rate is estimated and tested for deflation. If deflation has taken place, deflation credit is calculated and accumulated. If, alternatively, inflation has occurred, the amount of principal adjustment is determined by determining the product of the inflation rate and the account balance prior to the present retirement. Fixed adjustment is represented by the product of the fixed interest rate and the balance. When the cumulative deflation credit (CDC) is greater than the inflation adjustment for any given iteration period, the CDC is reduced in proportion to the inflation adjustment and the account balance adjusted to reflect the principal retirement and enhanced to reflect the fixed adjustment.

Alternatively, when the inflation adjustment is higher than the CDC, the inflation adjustment is reduced in proportion to the CDC and the CDC reset to zero. Balance adjustment is accomplished by reducing the balance in proportion to the principal repayment and enhanced in proportion to fixed and inflation adjustment. Although under Group II accounts, actual cash flow consists of the principal retirement, "bookable" cash flow is represented by both principal retirement and inflation and fixed adjustments to the principal. Thus, this "bookable" inflation adjustment factor is reported to the account holder or borrower for, for example, income tax purposes.

Group III and IV accounts are characterized by an accrual component that is divided into a fixed interest component and a variable interest component with the variable component being responsive to inflation. For both Group III and IV accounts, the fixed interest component may be viewed as a part of the depositor's interest on the balance, and retired by a preselected schedule over the term of the deposit or by amortization. However, the variable interest component serves to enhance the principal and therefore represents a deferral and capitalization of interest into the principal. Therefore, principal growth is observed.

Figure 4:
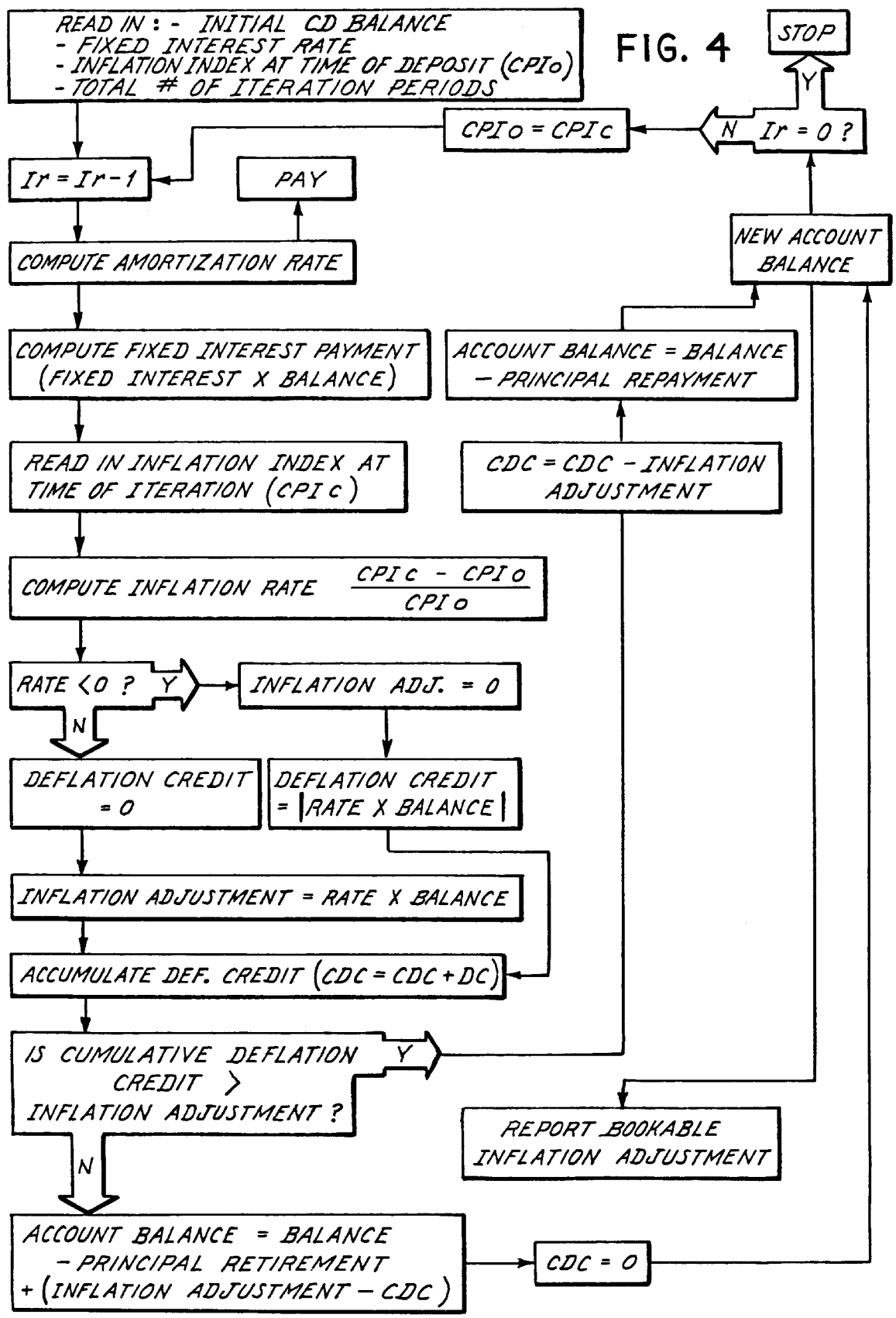
FIG. 4 is a flow diagram of the steps for servicing Group IV deposit or loan accounts.

Group III and IV accounts differ in terms of how their respective adjusted principals are retired. In Group III deposits, the principal is retired by a preselected schedule over the term. Alternatively Group IV accounts have principals which are retired by amortization. FIG. 4 is illustrative of the mechanics of Group IV accounts. As depicted therein, Group IV accounts are serviced by first determining the preliminary series of variables: the amount of the initial deposit, the fixed interest rate to be paid, the inflation index at the time of the deposit (CPIo), the total number of iterations or adjustment periods (Ir) and the retirement schedule.

Proceeding through the flow chart of FIG. 4, as with the previous accounts the first operator counts the number of iterations remaining in the scheduled account term. The account balance amortization is calculated to determine that portion of the principal to be retired at that iteration period. In particular, amortization of the balance is achieved using the formula:

$$R = \frac{A}{PVIF}$$

where:
R is the payment due the account holder;
A is the amount of the balance to be amortized; and
PVIF is defined as $$\sum_{I=1}^{N} \left( \frac{1}{(1+i)^I} \right)$$

where N is the number of iteration periods remaining+1, and i is the fixed interest rate The fixed interest component is calculated by applying the fixed interest rate to the account balance. Once determined, fixed interest component is generally retired during the present iteration by disbursement to the account holder. Alternatively, the fixed component may be withheld for later retirement, depending upon the requirements of the particular schedule.

The inflation rate is estimated and tested for deflation. With Group IV accounts, during times of deflation, one would expect a diminishment of the balance in proportion to the resultant increase in "real" dollars on deposit. However, the present system avoids this diminishment by storing deflationary units in the form of deflation credit. As with the foregoing account groups, deflation credit is cumulated, reserved and not applied against the account balance until inflation resumes to a sufficient level to counter it.

Thus, when the inflation adjustment is greater than the CDC, the account balance is reduced in proportion to the principal retired and enhanced in proportion to the level of inflation. If deflation credit has accumulated to a greater extent than the inflation adjustment during the prior iteration period, the balance is reduced only in proportion to the principal retirement. Once a new balance is established, the iteration cycle is completed by testing whether the present cycle represents the final iteration period and, if not, by setting the index level of the present cycle equal to the initial index for use in the next cycle.

The flow chart of FIG. 4 may be modified to service Group III accounts by retiring a set proportion or amount of the balance instead of amortizing the balance. Since such a retirement is of a "preselected amount," the final iteration may include a lump sum payment of the balance which remains. That is, the principal retirement of Group III accounts, being a preselected amount, would not necessarily track the inflation adjustments, thus potentially leaving an unretired portion due the account holder at maturity.

Matching Deposit Accounts with Loan Accounts

During times of high inflation, an inflation—indexed deposit account, standing alone, would present a substantial risk to the capital structure of the institution that receives and services them. This is the result of the fact that more inflated dollars must necessarily be deposited into the account by the institution at each iteration period to maintain a constant account balance in terms of real dollars. To remove this risk, the present invention provides a system for matching the foregoing inflation-adjusted deposit accounts with loan accounts.

Figure 5:
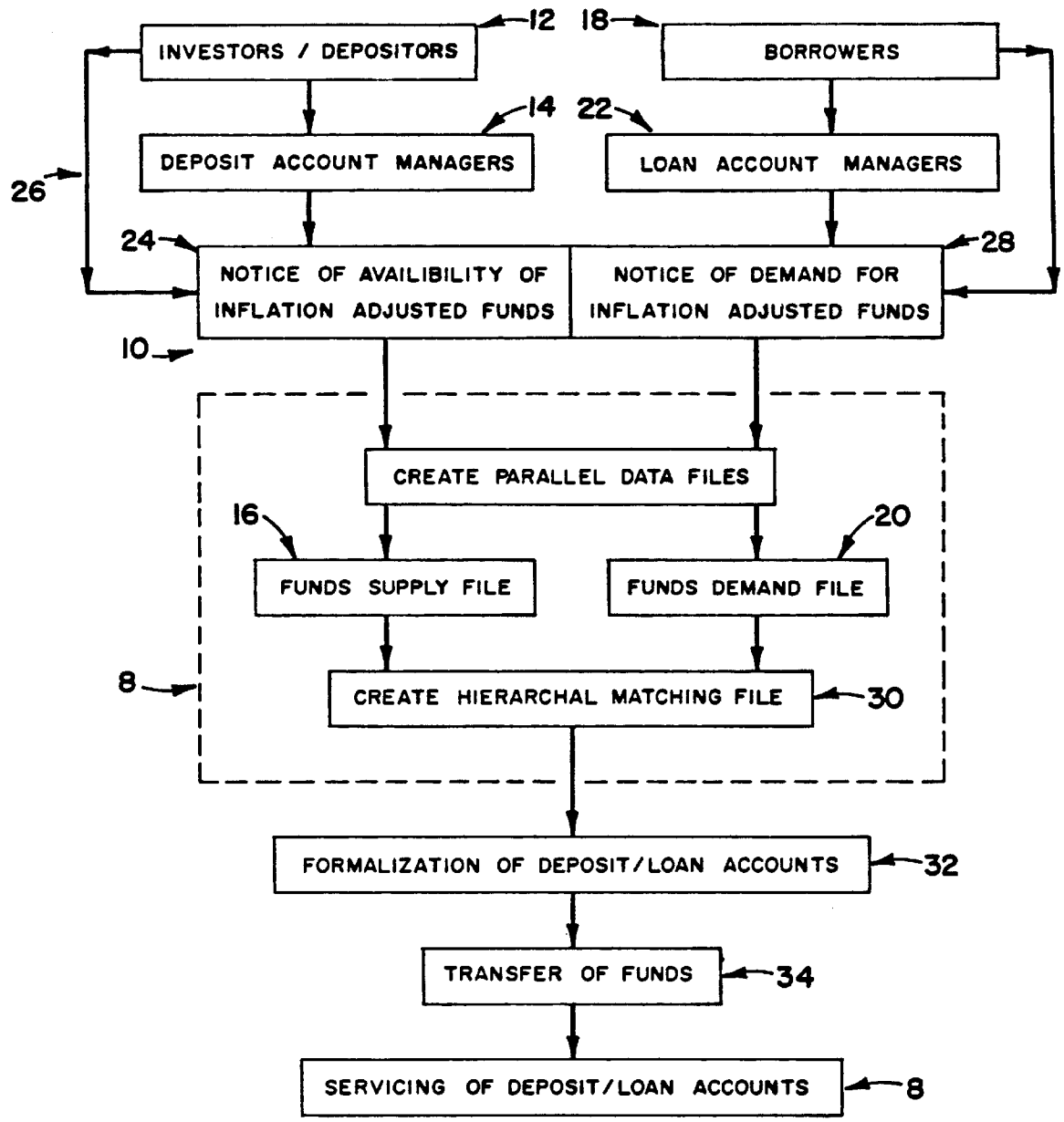
FIG. 5 is a schematic view of the deposit/loan matching process.

Referring to FIG. 5, is shown in representative fashion, a flow diagram of the matching process. Investors or Depositors 12 direct Deposit Account Manager 14, for example, a pension fund manager, to file Notice of Availability 24 ("NA") of funds for inflation-adjusted deposit accounts 2 with organizing company 10. Alternatively, those investors 26 not represented by account manager 14 file NA 24 directly with origanizing company 10. Similarly, borrowers 18 or loan account managers 22, for example, mortgage brokers, file Notice of Demand 28 ("ND") for inflation-adjusted loan funds. Both ND 28 and NA 24 include such parameters as amount of funds available or demanded term of account, duration of account, and type of account including its proposed schedule. Independent variables such as credit rating of borrower 18, characteristics of project for which funds are sought and underwriting constraints if any, may be included in the ND 28. Organizing company 10, or alternatively intermediary 6 lists the characteristics on parallel databases, DFADF 16 and LFADF 20, representing supply funds and demand funds, respectively.

Accounts are matched by matching parameters stored in DFADF 16 or LFDDF 20 to create a Hierarchical Matching File 30 ("HML"). Parameters of the demand and supply files 16,20 are thus matched according to hierarchal considerations generally including account amount, term and duration as primary considerations. A plurality of loans may be matched with a single deposit, or a plurality of deposits with a single loan, in order to match the overall amounts. In situations where a plurality of loans are matched with a plurality of deposits, the various amounts are totaled to achieve a total balance match.

Duration is a mathematical expression of when the average time-weighted dollar is either received or paid out of a particular account. It provides information concerning the size and timing of the payment stream or cash flow of the account. Moreover, duration embodies an expression of the relation of payment or disbursement size to yield-to-maturity of the account. The mathematical expression of the formula is:

$$D = \frac{\sum_{t=1}^{m} \frac{t \times CF_t}{(1+r)^t}}{\sum_{t=1}^{m} \frac{CF_t}{(1+r)^t}}$$

Where D=duration, r=yield-to maturity, t=time of cash flow, m=term and $CF_+$=cash flow at time, t.

When this formula is applied for example, to a $1,000 standard-fixed-payment deposit account with a five-year term and 12% total annual interest, the calculated duration is 4.04 years. That is, the average time-weighted dollar is paid out at 4.04 years. In general, group I accounts will show greater cash flows early in their terms relative to group II accounts, therefore group I accounts will often have lower durations than scheduled group II accounts. The duration of Group III and IV accounts will generally fall between that of Group I and II accounts. Therefore, duration is an expression of the average cash flow of the account. In matching the duration of a loan account with that of a deposit account, or in matching the average duration of a plurality of accounts, the cash flows of deposit and loan accounts so matched will compensate for one another, thereby protecting the capital structure of the intermediary.

After matching is achieved by the HMF 20, borrowers 18 and depositors 12, or their respective account managers 22,14, are notified of the match and deposit and loan accounts 2,4 are formalized 32 followed by the transfer of funds 34 to intermediary 6. Accounts will then be serviced by the account management dataprocessor 8.

EXAMPLE I

Servicing of Inflation—Adjusted Deposit Accounts

Data processing and post-data processing activities are utilized to service the Group IV deposit accounts of the present invention by periodically adjusting the outstanding balance of the account to reflect the effects of inflation on it.

a. Mechanics of a Typical Group IV Deposit Account

Figure 6:
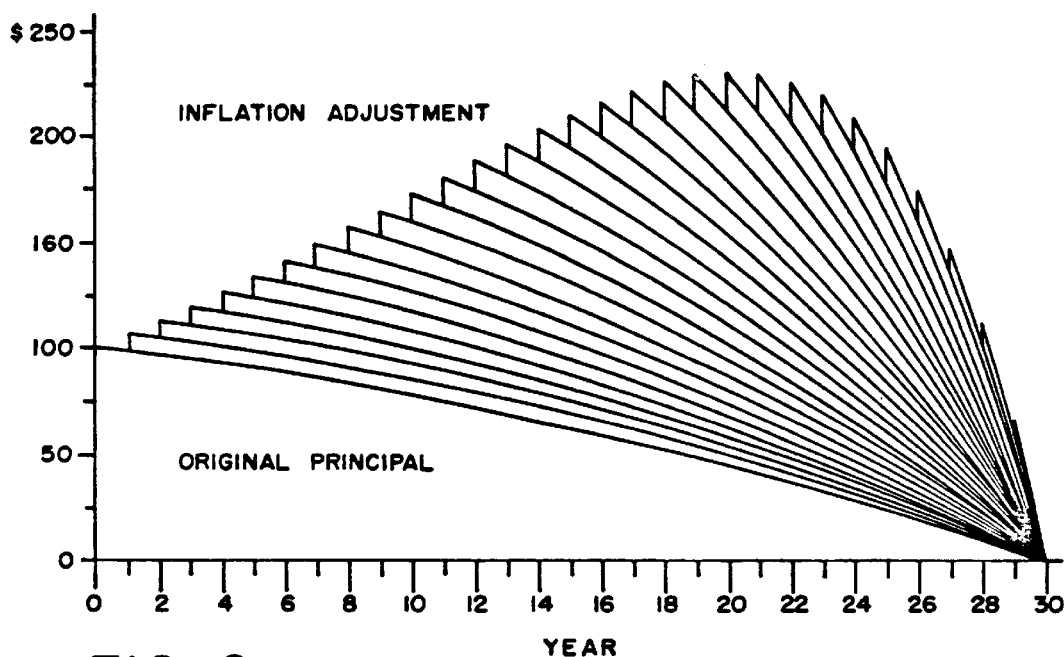
FIG. 6 is a graphic display of year-end balances and adjustment amortization of a typical Group IV Deposit Account.

Refering to FIG. 6 is shown a representative example of a hypothetical Group IV deposit account in terms of its year-end balance and adjustment amortization. The deposit account therein depicted assumes an initial balance of $100, a fixed annual interest rate of 4%, a steady inflation rate 8% (e.g., an 8% steady annual increase in the CPI), a 30-year term with 30 annual iteration periods, and a schedule which retires the fixed interest component as it accrues (i.e., annually).

As will be appreciated by those skilled in the art, the deposit account of the present example is somewhat similar to a 30-year annuity which is supplemented annually with additional annuities to reflect the higher price level in the economy. Thus, the fixed amortization rate becomes a real interest rate because the depositor also receives additional interest equal to the inflation rate multiplied by the account balance. Each iteration period, if there is a positive increase in the CPI, additional inflation interest accrues but it is payable over the remaining term as an additional stream of annuity payments. The deposit account can be viewed as 30 separate annuities with an original annuity and potentially 29 annual inflation additions.

Figure 7:
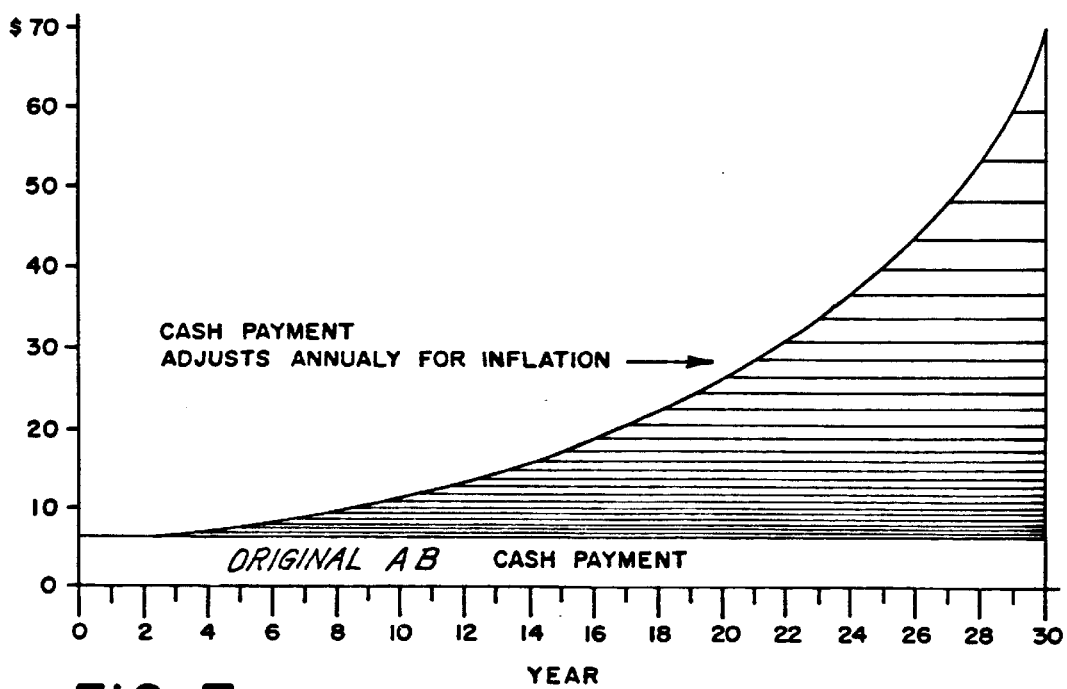
FIG. 7 depicts the total principal and interest payments on the hypothetical Group IV deposit account of FIG. 6.
Figure 8:
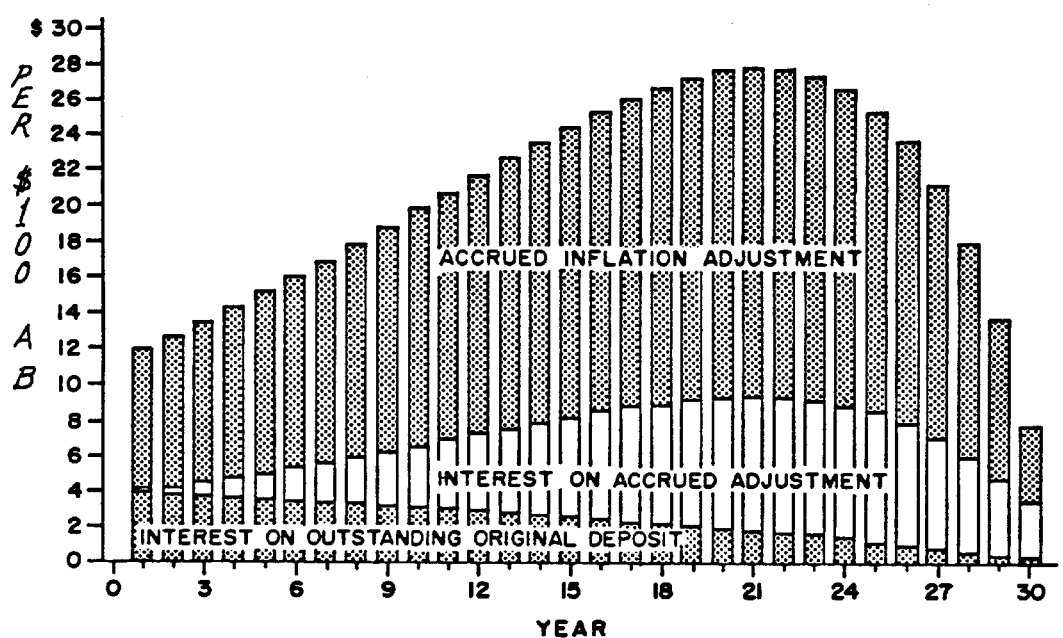
FIG. 8 is a graphic display of the bookable income components of the hypothetical Group IV deposit account of FIG. 6.

The depositor's total receipts (including principal and interest) on the deposit account increase in lock-step with the CPI so that the payment the depositor receives is constant in real purchasing power. In this graphical presentation the inflation rate is a steady 8% for the entire 30-year term of the account so the depositor's payment increases by 8% each year. The deposit balance changes on any distribution date since inflation interest is added to the deposit balance and the annuity payment retires a portion of the existing principal with each iteration. FIG. 7 depicts the total principal and interest payment of the hypothetical account of FIG. 6. As will be appreciated, the payments to the account holder increase substantially over time. FIG. 8 graphically displays the "bookable" income components of the periodic retirements of the hypothetical deposit account. Note that the interest payments on the original deposit decreases in "straight-line" fashion with time, whereas the bookable accrued inflation adjustment and interest on accrued adjustment peak at approximately year 21 before declining.

b. Comparing The Effects of Anticipated Levels of Inflation on the Account

The data processing methodology of the present invention may be used to compare the cash flow characteristics of a particular type of deposit account for selected or anticipated levels of inflation. For example, Table I, which was generated using the servicing scheme of FIG. 4, numerically displays the cash flow characteristics of the typical Group IV account of the present example (i.e., it assumes an 8% level of inflation and a 4% fixed interest rate). Depicted therein are the periodic (i.e., yearly) bookable inflation adjustment, interest earned, deposit returned (i.e., principal retired), year-end account balance and the net cash flow.

Figure 9:
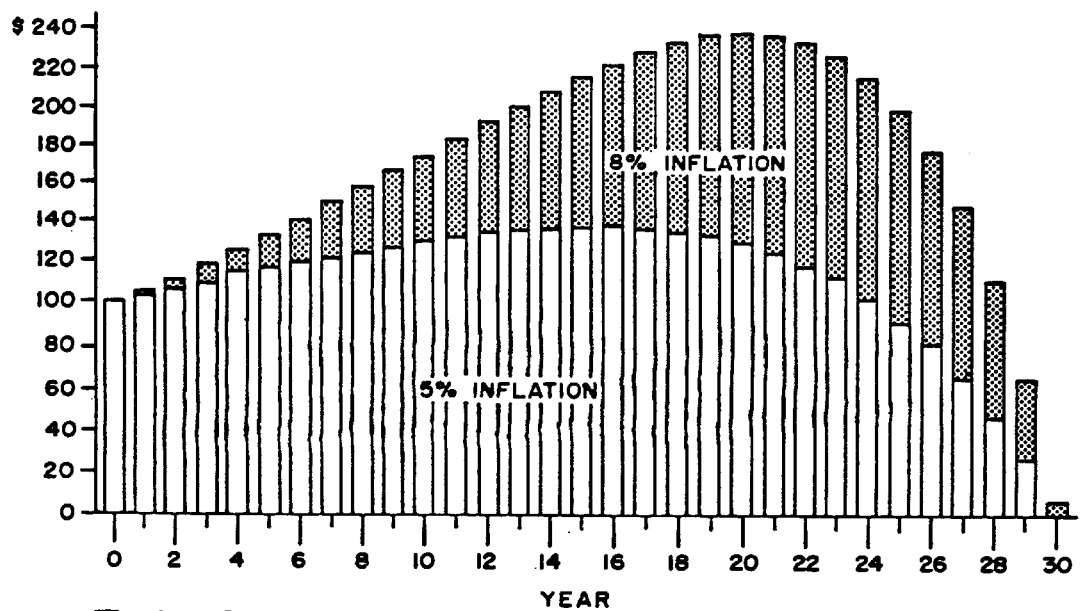
FIG. 9 graphically compares the cash flows generated by a Group IV deposit account assuming a steady 8% inflation rate with the same account assuming a steady 6% inflation rate.

Table II was also generated using the flow scheme of FIG. 4 and displays the cash flow characteristics of the same Group IV account but including an anticipated inflation rate of 6% instead of 8%. All other variables, including the term, deposit amount and fixed interest rate, are the same. The comparative cash flows for 8% and 6% inflation are displayed graphically in FIG. 9. Note

TABLE I

| DEPOSIT AMOUNT: | $100.00 | INTEREST RATE: | 4.00% |
| TERM IN YEARS: | 30 | INFLATION: | 8.00% |

ANALYSIS FOR DEPOSITOR:

| YEAR | BOOKABLE INFLATION ADJUSTMENT | INTEREST EARNED | DEPOSIT RETURNED | YEAR END BALANCE | CASH FLOW |
|---|---|---|---|---|---|
| 0 | | | | 100.0000 | |
| 1 | 8.0000 | 4.0000 | 1.7830 | 106.2170 | 5.7830 |
| 2 | 8.4974 | 4.2487 | 2.0054 | 112.7090 | 6.2540 |
| 3 | 9.0167 | 4.5084 | 2.2556 | 119.4701 | 6.7640 |
| 4 | 9.5576 | 4.7788 | 2.5374 | 126.4903 | 7.3162 |
| 5 | 10.1192 | 5.0596 | 2.8546 | 133.7550 | 7.9142 |
| 6 | 10.7004 | 5.3502 | 3.2117 | 141.2436 | 8.5619 |
| 7 | 11.2995 | 5.6497 | 3.6140 | 148.9292 | 9.2637 |
| 8 | 11.9143 | 5.9572 | 4.0671 | 156.7764 | 10.0243 |
| 9 | 12.5421 | 6.2711 | 4.5777 | 164.7408 | 10.8487 |
| 10 | 13.1793 | 6.5896 | 5.1531 | 172.7669 | 11.7427 |
| 11 | 13.8214 | 6.9107 | 5.8018 | 180.7865 | 12.7125 |
| 12 | 14.4629 | 7.2315 | 6.5334 | 188.7160 | 13.7648 |
| 13 | 15.0973 | 7.5486 | 7.3587 | 196.4546 | 14.9073 |
| 14 | 15.7164 | 7.8582 | 8.2901 | 203.8809 | 16.1483 |
| 15 | 16.3105 | 8.1552 | 9.3418 | 210.8496 | 17.4971 |
| 16 | 16.8680 | 8.4340 | 10.5301 | 217.1875 | 18.9640 |
| 17 | 17.3750 | 8.6875 | 11.8734 | 222.6891 | 20.5609 |
| 18 | 17.8151 | 8.9076 | 13.3934 | 227.1108 | 22.3009 |
| 19 | 18.1689 | 9.0844 | 15.1147 | 230.1650 | 24.1992 |
| 20 | 18.4132 | 9.2066 | 17.0665 | 231.5117 | 26.2731 |
| 21 | 18.5209 | 9.2605 | 19.2828 | 230.7498 | 28.5433 |
| 22 | 18.4600 | 9.2300 | 21.8042 | 227.4055 | 31.0342 |
| 23 | 18.1924 | 9.0962 | 24.6798 | 220.9181 | 33.7760 |
| 24 | 17.6735 | 8.8367 | 27.9704 | 210.6212 | 36.8071 |
| 25 | 16.8497 | 8.4248 | 31.7537 | 195.7173 | 40.1785 |
| 26 | 15.6574 | 7.8287 | 36.1347 | 175.2399 | 43.9634 |

TABLE I-continued

| 27 | 14.0192 | 7.0096 | 41.2673 | 147.9919 | 48.2769 |
| 28 | 11.8393 | 5.9197 | 47.4090 | 112.4222 | 53.3287 |
| 29 | 8.9938 | 4.4969 | 55.1089 | 66.3071 | 59.6058 |
| 30 | 5.3046 | 2.6523 | 66.3071 | 5.3046 | 68.9594 |

*THE BOOKABLE INFLATION ADJUSTMENT FOR THE 30TH YEAR WILL BE ADDED TO THE OTHER CASH FLOW COMPONENTS AND PAID AT THAT TIME, SO THE FINAL BALANCE WILL BE 0.

TABLE II

| DEPOSIT AMOUNT: | $100.00 | INTEREST RATE: | 4.00% |
| TERM IN YEARS: | 30 | INFLATION: | 6.00% |

ANALYSIS FOR DEPOSITOR:

| YEAR | BOOKABLE INFLATION ADJUSTMENT | INTEREST EARNED | DEPOSIT RETURNED | YEAR END BALANCE | CASH FLOW |
|---|---|---|---|---|---|
| 0 | | | | 100.0000 | |
| 1 | 6.0000 | 4.0000 | 1.7830 | 104.2170 | 5.7830 |
| 2 | 6.2530 | 4.1687 | 1.9676 | 108.5024 | 6.1363 |
| 3 | 6.5101 | 4.3401 | 2.1715 | 112.8411 | 6.5116 |
| 4 | 6.7705 | 4.5136 | 2.3966 | 117.2150 | 6.9102 |
| 5 | 7.0329 | 4.6886 | 2.6452 | 121.6026 | 7.3338 |
| 6 | 7.2962 | 4.8641 | 2.9199 | 125.9789 | 7.7840 |
| 7 | 7.5587 | 5.0392 | 3.2234 | 130.3142 | 8.2626 |
| 8 | 7.8189 | 5.2126 | 3.5588 | 134.5743 | 8.7713 |
| 9 | 8.0745 | 5.3830 | 3.9294 | 138.7194 | 9.3124 |
| 10 | 8.3232 | 5.5488 | 4.3392 | 142.7034 | 9.8879 |
| 11 | 8.5622 | 5.7081 | 4.7922 | 146.4733 | 10.5004 |
| 12 | 8.7884 | 5.8589 | 5.2933 | 149.9684 | 11.1523 |
| 13 | 8.9981 | 5.9987 | 5.8478 | 153.1187 | 11.8465 |
| 14 | 9.1871 | 6.1247 | 6.4614 | 155.8445 | 12.5861 |
| 15 | 9.3507 | 6.2338 | 7.1408 | 158.0543 | 13.3746 |
| 16 | 9.4833 | 6.3222 | 7.8934 | 159.6442 | 14.2156 |
| 17 | 9.5787 | 6.3858 | 8.7276 | 160.4953 | 15.1134 |
| 18 | 9.6297 | 6.4198 | 9.6528 | 160.4722 | 16.0726 |
| 19 | 9.6283 | 6.4189 | 10.6798 | 159.4207 | 17.0987 |
| 20 | 9.5652 | 6.3768 | 11.8209 | 157.1651 | 18.1977 |
| 21 | 9.4299 | 6.2866 | 13.0904 | 153.5046 | 19.3770 |
| 22 | 9.2103 | 6.1402 | 14.5051 | 148.2097 | 20.6453 |
| 23 | 8.8926 | 5.9284 | 16.0849 | 141.0174 | 22.0133 |
| 24 | 8.4610 | 5.6407 | 17.8542 | 131.6243 | 23.4949 |
| 25 | 7.8975 | 5.2650 | 19.8439 | 119.6779 | 25.1089 |
| 26 | 7.1807 | 4.7871 | 22.0958 | 104.7627 | 26.8829 |
| 27 | 6.2858 | 4.1905 | 24.6706 | 86.3779 | 28.8611 |
| 28 | 5.1827 | 3.4551 | 27.6710 | 63.8896 | 31.1262 |
| 29 | 3.8334 | 2.5556 | 31.3184 | 36.4045 | 33.8740 |
| 30 | 2.1843 | 1.4562 | 36.4045 | 2.1843 | 37.8607 |

**THE BOOKABLE INFLATION ADJUSTMENT FOR THE 30TH YEAR WILL BE ADDED TO THE OTHER CASH FLOW COMPONENTS AND PAID AT THAT TIME, SO THE FINAL BALANCE WILL BE 0.

that there is a significant increase in payments in the later years of the Group IV account term with 8% when compared to 6% inflation.

Thus, by inserting various anticipated inflation rates into the servicing schemes of the present invention, the effects of inflation on the resultant cash flows of the account may be ascertained. In this manner, the effects of such accounts on the capital structure of the account holder may be anticipated and both cases prove that the depositor would receive a stream of payments with constant buying power at any time in the future regardless of the behavior of inflation.

EXAMPLE II

The Partially-Hedged Program

A lending institution, under certain circumstances, may desire to match an inflation-adjusted deposit account with a standard-fixed-payment mortgage loan. Under such a "partially-hedged" match, the net cash flow to the institution during periods of lower inflation will be higher than during periods of high inflation. That is, the standard-fixed-payment loan will generate a fixed cash flow whereas the deposit account must be satisfied with the inflation-adjusted dollars.

Figure 10:
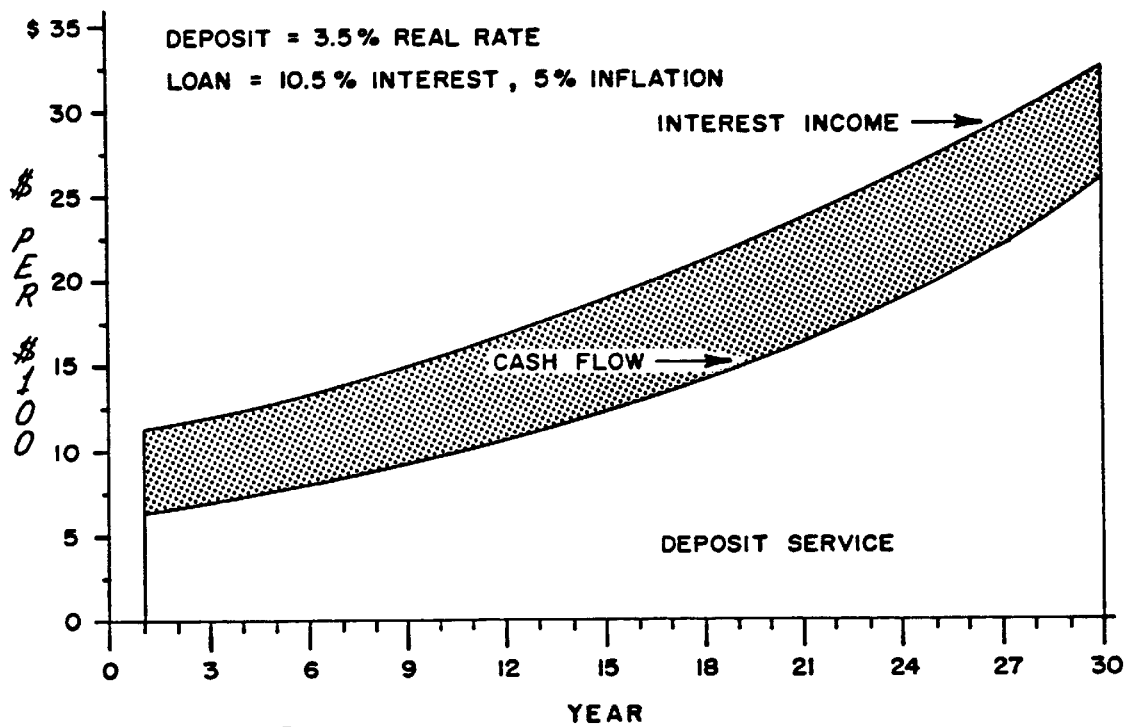
FIG. 10 is a graphic display of the buildup of positive cash flow from an original $100 Group IV deposit account as a standard-fixed-payment loan.

For example, FIG. 10 displays the buildup of positive cash flow from an original $100 inflation-adjusted Group IV deposit account and a standard-fixed-payment loan program which are tracked for 30 years under the assumption that the deposits were used to fund 5-year loans at 10.5%, payable monthly, with principal amortized in equal semiannual payments and with net cash flows reinvested immediately on the same basis. These loan proceeds are compared to the cash obligations on the deposit account.

These calculations from a simultaneous deposit-loan transaction do not include any of the costs of loan administration or the servicing costs of the deposit account, which is minimal with large institutional deposits. The servicing fee has been netted out but there is no need to deduct the customary costs of a retail deposit activity from this spread.

Though the net interest spread is quite large not all of this cash flow needs to be immediately reflected as income for tax purposes since the inflation adjustment interest must be recognized as an expense for accounting and tax purposes. The accrual of the interest expense has the effect of reducing taxable income in the early years of the deposit account term. The accrual of the inflation adjustment interest to the deposit account balance is accurately reflected in the intermediaries' deposit liabilities and also in the intermediaries' net worth.

Table III shows both asset and liability balance adjustments through the 30-year term on the original $100 deposit and loan as well as the net return on assets. Even with only a 10.5% loan fixed rate, the net return on assets is reasonably high at 1.11% and grows over time. Tables IV and V convey the same information under an assumed loan rate of 11.5% and 12.5%, respectively. As one of skill in the art will appreciate, these higher loan rates substantially increase the net return on assets.

TABLE III

| AB DEPOSIT INFORMATION: | LOAN INFORMATION |
|---|---|
| INITIAL DEPOSIT: $100 | TERM & AMORTIZATION: OPTIONAL |
| TERM (years): 30 | LOAN & REINVESTMENT RATE (1): 10.50% |
| REAL INTEREST RATE: 3.50% | ORIGINATION FEE: 0.00% |
| INFLATION RATE (1): 5.00% | BANK INFORMATION |
| TTH ARRANGEMENT FEE: 1.00% | MARGINAL TAX RATE: 0.00% |
| TTH ANNUAL SERVICE FEE: 1.00% | DIVIDEND PAYOUT RATIO: 0.00% |

| | BALANCE SHEET | | | CASH FLOWS | | | | RATIOS | |
|---|---|---|---|---|---|---|---|---|---|
| YEAR | AB DEPOSIT BALANCE | LOAN BALANCE | NET WORTH (2) | INTEREST INCOME(3) | AB DEPOSIT SERVICE | NET CASH FLOW(3) | NET INCOME (2) | RETURN ON AVG ASSETS | CAPITAL TO ASSET RATIO |
| 0 | $100.000 | $ 99.000 | | | | | | | |
| 1 | 103.063 | 103.182 | $ 0.119 | $10.910 | $ 6.468 | $4.442 | $ 1.119 | 1.11% | 0.12% |
| 2 | 106.109 | 107.519 | 1.430 | 11.371 | 6.775 | 4.596 | 1.291 | 1.23 | 1.31 |
| 3 | 109.122 | 112.014 | 2.892 | 11.849 | 7.097 | 4.752 | 1.482 | 1.35 | 2.58 |
| 4 | 112.084 | 116.673 | 4.589 | 12.344 | 7.434 | 4.911 | 1.696 | 1.48 | 3.93 |
| 5 | 114.976 | 121.499 | 6.524 | 12.858 | 7.786 | 5.072 | 1.935 | 1.62 | 5.37 |
| 6 | 117.773 | 126.497 | 8.725 | 13.390 | 8.154 | 5.236 | 2.201 | 1.78 | 6.90 |
| 7 | 120.449 | 131.672 | 11.223 | 13.940 | 8.539 | 5.402 | 2.498 | 1.93 | 8.52 |
| 8 | 122.976 | 137.027 | 14.051 | 14.511 | 8.941 | 5.570 | 2.828 | 2.10 | 10.25 |
| 9 | 125.321 | 142.567 | 17.246 | 15.101 | 9.361 | 5.740 | 3.195 | 2.29 | 12.10 |
| 10 | 127.447 | 148.297 | 20.850 | 15.711 | 9.801 | 5.910 | 3.604 | 2.48 | 14.06 |
| 11 | 129.313 | 154.221 | 24.908 | 16.343 | 10.260 | 6.082 | 4.058 | 2.68 | 16.15 |
| 12 | 130.872 | 160.343 | 29.471 | 16.996 | 10.741 | 6.255 | 4.563 | 2.90 | 18.38 |
| 13 | 132.074 | 166.668 | 34.594 | 17.670 | 11.243 | 6.427 | 5.123 | 3.13 | 20.76 |
| 14 | 132.861 | 173.200 | 40.340 | 18.367 | 11.768 | 6.599 | 5.746 | 3.38 | 23.29 |
| 15 | 133.168 | 179.944 | 46.776 | 19.087 | 12.317 | 6.770 | 6.436 | 3.65 | 25.99 |
| 16 | 132.925 | 186.904 | 53.978 | 19.830 | 12.892 | 6.939 | 7.203 | 3.93 | 28.88 |
| 17 | 132.052 | 194.083 | 62.031 | 20.597 | 13.493 | 7.105 | 8.053 | 4.23 | 31.96 |
| 18 | 130.459 | 201.485 | 71.026 | 21.389 | 14.122 | 7.267 | 8.995 | 4.55 | 35.25 |
| 19 | 128.048 | 209.114 | 81.066 | 22.204 | 14.781 | 7.423 | 10.040 | 4.89 | 38.77 |
| 20 | 124.707 | 216.970 | 92.264 | 23.045 | 15.472 | 7.573 | 11.198 | 5.26 | 42.52 |
| 21 | 120.312 | 225.057 | 104.745 | 23.911 | 16.198 | 7.713 | 12.481 | 5.65 | 46.54 |
| 22 | 114.724 | 233.372 | 118.648 | 24.802 | 16.962 | 7.840 | 13.903 | 6.07 | 50.84 |
| 23 | 107.786 | 241.913 | 134.127 | 25.718 | 17.768 | 7.951 | 15.479 | 6.51 | 55.44 |
| 24 | 99.320 | 250.671 | 151.351 | 26.660 | 18.621 | 8.039 | 17.224 | 6.99 | 60.38 |
| 25 | 89.123 | 259.632 | 170.509 | 27.625 | 19.530 | 8.094 | 19.158 | 7.51 | 65.67 |
| 26 | 76.959 | 268.770 | 191.811 | 28.612 | 20.509 | 8.104 | 21.301 | 8.06 | 71.37 |
| 27 | 62.549 | 276.036 | 215.486 | 29.619 | 21.576 | 6.042 | 23.677 | 8.66 | 77.50 |
| 28 | 45.539 | 287.342 | 241.802 | 30.641 | 22.781 | 7.859 | 26.314 | 9.31 | 84.15 |
| 29 | 25.438 | 296.490 | 271.051 | 31.666 | 24.226 | 7.440 | 29.249 | 10.02 | 91.42 |
| 30 | 1.272 | 304.877 | 303.605 | 32.674 | 26.341 | 6.333 | 32.553 | 10.83 | 99.58 |

(1) THESE RATES ARE TREATED AS CONSTANTS; HOWEVER, IF INFLATION INCREASES LENDING RATES ALSO RISE.
(2) THE NET WORTH AND INCOME COLUMNS ARE NET OF LOAN ORIGINATION AND SERVICING COSTS, FEES, TAXES AND DIVIDENDS AT THE STATED RATES.
(3) PRINCIPAL REPAYMENTS ARE PRESUMED TO BE REINVESTED AND THEREFORE ARE EXCLUDED FROM THE CASH FLOW ANALYSIS.

TABLE IV

AB DEPOSIT INFORMATION:  
INITIAL DEPOSIT: $100  
TERM (years): 30  
REAL INTEREST RATE: 3.50%  
INFLATION RATE (1): 5.00%  
TTH ARRANGEMENT FEE: 1.00%  
TTH ANNUAL SERVICE FEE: 1.00%

LOAN INFORMATION  
TERM & AMORTIZATION: OPTIONAL  
LOAN & REINVESTMENT RATE (1): 11.50%  
ORIGINATION FEE: 0.00%  
BANK INFORMATION  
MARGINAL TAX RATE: 0.00%  
DIVIDEND PAYOUT RATIO: 0.00%

| | BALANCE SHEET | | | CASH FLOWS | | | | RATIOS | |
|---|---|---|---|---|---|---|---|---|---|
| YEAR | AB DEPOSIT BALANCE | LOAN BALANCE | NET WORTH (2) | INTEREST INCOME(3) | AB DEPOSIT SERVICE | NET CASH FLOW(3) | NET INCOME (2) | RETURN ON AVG ASSETS | CAPITAL TO ASSET RATIO |
| 0 | $100.000 | $ 99.000 | | | | | | | |
| 1 | 103.063 | 104.271 | $ 1.214 | $12.005 | $ 6.468 | $ 5.537 | $ 2.214 | 2.18% | 1.16% |
| 2 | 106.109 | 109.887 | 3.778 | 12.645 | 6.775 | 5.869 | 2.564 | 2.39 | 3.44 |
| 3 | 109.122 | 115.858 | 6.736 | 13.325 | 7.097 | 6.228 | 2.958 | 2.62 | 5.81 |
| 4 | 112.084 | 122.221 | 10.137 | 14.049 | 7.434 | 6.615 | 3.401 | 2.86 | 8.29 |
| 5 | 114.976 | 129.010 | 14.035 | 14.820 | 7.786 | 7.035 | 3.898 | 3.10 | 10.88 |
| 6 | 111.773 | 136.263 | 18.490 | 15.644 | 8.154 | 7.490 | 4.455 | 3.36 | 13.57 |
| 7 | 120.449 | 144.020 | 23.570 | 16.523 | 8.539 | 7.985 | 5.080 | 3.63 | 16.37 |
| 8 | 122.976 | 152.328 | 29.351 | 17.464 | 8.941 | 8.523 | 5.781 | 3.90 | 19.27 |
| 9 | 125.321 | 161.238 | 35.917 | 18.471 | 9.361 | 9.110 | 6.566 | 4.19 | 22.28 |
| 10 | 127.447 | 110.808 | 43.361 | 19.552 | 9.801 | 9.751 | 7.444 | 4.48 | 25.39 |
| 11 | 129.313 | 181.101 | 51.789 | 20.712 | 10.260 | 10.452 | 8.427 | 4.79 | 28.60 |
| 12 | 130.872 | 192.188 | 61.316 | 21.960 | 10.741 | 11.219 | 9.527 | 5.10 | 31.90 |
| 13 | 132.074 | 204.148 | 72.074 | 23.305 | 11.243 | 32.062 | 10.758 | 5.43 | 35.30 |
| 14 | 132.861 | 217.067 | 84.207 | 24.755 | 11.768 | 12.987 | 12.133 | 5.76 | 38.79 |
| 15 | 133.168 | 231.046 | 97.877 | 26.321 | 12.317 | 14.004 | 13.670 | 6.10 | 42.36 |
| 16 | 132.925 | 246.191 | 113.266 | 28.016 | 12.892 | 15.125 | 15.389 | 6.45 | 46.01 |
| 17 | 132.052 | 262.626 | 130.574 | 29.853 | 13.493 | 16.360 | 17.308 | 6.80 | 49.72 |
| 18 | 130.459 | 280.485 | 150.026 | 31.846 | 14.122 | 17.724 | 19.452 | 7.16 | 53.49 |
| 19 | 128.048 | 299.921 | 111.873 | 34.011 | 14.781 | 19.231 | 21.847 | 7.53 | 57.31 |
| 20 | 124.707 | 321.101 | 196.394 | 36.368 | 15.472 | 20.896 | 24.521 | 7.90 | 61.16 |
| 21 | 120.312 | 344.212 | 223.900 | 38.936 | 16.198 | 22.738 | 27.507 | 8.27 | 65.05 |
| 22 | 114.724 | 369.465 | 254.741 | 41.739 | 16.962 | 24.777 | 30.840 | 8.64 | 68.95 |
| 23 | 107.786 | 397.088 | 289.302 | 44.801 | 17.768 | 27.034 | 34.561 | 9.02 | 72.86 |
| 24 | 99.320 | 427.337 | 328.017 | 48.151 | 18.621 | 29.530 | 38.715 | 9.39 | 76.76 |
| 25 | 89.123 | 460.492 | 371.369 | 51.819 | 19.530 | 32.288 | 43.352 | 9.77 | 80.65 |
| 26 | 76.959 | 496.856 | 419.897 | 55.839 | 20.509 | 35.330 | 48.528 | 10.14 | 84.51 |
| 27 | 62.549 | 536.752 | 474.203 | 60.248 | 21.578 | 38.671 | 54.306 | 10.51 | 88.35 |
| 28 | 45.539 | 580.503 | 534.963 | 65.086 | 22.781 | 42.305 | 60.760 | 10.88 | 92.16 |
| 29 | 25.438 | 628.376 | 602.938 | 70.391 | 24.226 | 46.165 | 67.975 | 11.25 | 95.95 |
| 30 | 1.272 | 680.286 | 679.014 | 76.197 | 26.341 | 49.855 | 76.076 | 11.63 | 99.81 |

(1) THESE RATES ARE TREATED AS CONSTANTS; HOWEVER, IF INFLATION INCREASES LENDING RATES ALSO RISE.  
(2) THE NET WORTH AND INCOME COLUMNS ARE NET OF LOAN ORIGINATION AND SERVICING COSTS, FEES, TAXES AND DIVIDENDS AT THE STATED RATES.  
(3) PRINCIPAL REPAYMENTS ARE PRESUMED TO BE REINVESTED AND THEREFORE ARE EXCLUDED FROM THE CASH FLOW ANALYSIS.

TABLE V

AB DEPOSIT INFORMATION:  
INITIAL DEPOSIT: $100  
TERM (years): 30  
REAL INTEREST RATE: 3.50%  
INFLATION RATE (1): 5.00%  
TTH ARRANGEMENT FEE: 1.00%  
TTH ANNUAL SERVICE FEE: 1.00%

LOAN INFORMATION  
TERM & AMORTIZATION: OPTIONAL  
LOAN & REINVESTMENT RATE (1): 12.50%  
ORIGINATION FEE: 0.00%  
BANK INFORMATION  
MARGINAL TAX RATE: 0.00%  
DIVIDEND PAYOUT RATIO: 0.00%

| | BALANCE SHEET | | | CASH FLOWS | | | | RATIOS | |
|---|---|---|---|---|---|---|---|---|---|
| YEAR | AB DEPOSIT BALANCE | LOAN BALANCE | NET WORTH (2) | INTEREST INCOME(3) | AB DEPOSIT SERVICE | NET CASH FLOW(3) | NET INCOME (2) | RETURN ON AVG ASSETS | CAPITAL TO ASSET RATIO |
| 0 | $100.000 | $ 99.000 | | | | | | | |
| 1 | 103.063 | 105.381 | $ 2.318 | $13.109 | $6.468 | $ 6.641 | $3.318 | 3.25Z | 2.20Z |
| 2 | 106.109 | 112.301 | 6.192 | 13.954 | 6.775 | 7.179 | 3.84 | 3.56 | 5.51 |
| 3 | 109.122 | 119.818 | 10.696 | 14.870 | 7.09 | 7.773 | 4.504 | 3.88 | 8.93 |
| 4 | 112.084 | 127.998 | 15.914 | 15.866 | 7.434 | 8.432 | 5.218 | 4.21 | 12.43 |
| 5 | 114.976 | 136.916 | 21.940 | 16.949 | 7.786 | 9.163 | 6.026 | 4.55 | 16.02 |
| 6 | 117.773 | 146.654 | 28.881 | 18.130 | 8.154 | 9.976 | 6.941 | 4.90 | 19.69 |
| 7 | 120.449 | 157.307 | 36.858 | 19.419 | 8.539 | 10.881 | 7.9 | 5.25 | 23.43 |

TABLE V-continued

| AB DEPOSIT INFORMATION: | LOAN INFORMATION |
|---|---|
| INITIAL DEPOSIT: $100 | TERM & AMORTIZATION: OPTIONAL |
| TERM (years): 30 | LOAN & REINVESTMENT RATE (1): 12.50% |
| REAL INTEREST RATE: 3.50% | ORIGINATION FEE: 0.00% |
| INFLATION RATE (1): 5.00% | BANK INFORMATION |
| TTH ARRANGEMENT FEE: 1.00% | MARGINAL TAX RATE: 0.00% |
| TTH ANNUAL SERVICE FEE: 1.00% | DIVIDEND PAYOUT RATIO: 0.00% |

| | BALANCE SHEET | | | CASH FLOWS | | | RATIOS | |
|---|---|---|---|---|---|---|---|---|
| | | | | | | | | CAPITAL |
| YEAR | AB DEPOSIT BALANCE | LOAN BALANCE | NET WORTH (2) | INTEREST INCOME(3) | AB DEPOSIT SERVICE | NET CASH FLOW(3) | NET INCOME (2) | RETURN ON AVG ASSETS | TO ASSET RATIO |
| 8 | 122.976 | 168.982 | 46.005 | 20.830 | 8.941 | 11.889 | 9.147 | 5.61 | 27.23 |
| 9 | 125.321 | 181.9 | 56.46 | 22.376 | 9.361 | 13.015 | 10.470 | 5.97 | 31.07 |
| 10 | 127.447 | 195.888 | 68.441 | 24.03 | 9.801 | 14.22 | 11.965 | 6.34 | 34.94 |
| 11 | 129.313 | 211.408 | 82.095 | 25.939 | 10.260 | 15.678 | 13.654 | 6.70 | 38.83 |
| 12 | 130.872 | 228.528 | 97.656 | 27.994 | 10.741 | 17.253 | 15.561 | 7.07 | 42.3 |
| 13 | 132.074 | 247.444 | 115.30 | 30.261 | 11.243 | 19.018 | 1.714 | 7.44 | 46.62 |
| 14 | 132.861 | 268.374 | 135.514 | 32.66 | 11.68 | 20.997 | 20.144 | 7.81 | 50.49 |
| 15 | 133.168 | 291.568 | 158.400 | 35.537 | 12.31 | 23.220 | 22.886 | 8.17 | 54.33 |
| 16 | 132.925 | 317.305 | 184.380 | 38.608 | 12.892 | 25.17 | 25.980 | 8.53 | 58.11 |
| 17 | 132.052 | 345.903 | 213.851 | 42.016 | 13.493 | 28.524 | 29.471 | 8.89 | 61.82 |
| 1B | 130.459 | 377.720 | 24.261 | 45.803 | 14.122 | 31.681 | 33.410 | 9.23 | 65.46 |
| 19 | 128.048 | 413.160 | 285.113 | 50.016 | 14.781 | 35.235 | 37.852 | 9.5 | 69.01 |
| 20 | 124.07 | 452.681 | 327.974 | 54.709 | 15.472 | 39.237 | 42.862 | 9.90 | |
| 21 | 120.312 | 496.99 | 376.48 | 59.942 | 16.198 | 43.44 | 48.513 | 10.22 | 5.78 |
| 22 | 114.724 | 546.096 | 431.372 | 65.784 | 16.962 | 48.822 | 54.885 | 10.53 | 78.99 |
| 23 | 107.86 | 601.231 | 493.445 | 72.312 | 17.768 | 54.544 | 62.072 | 10.82 | 82.07 |
| 24 | 99.320 | 662.942 | 563.622 | 79.613 | 18.621 | 60.992 | 70.17 | 11.10 | 85.03 |
| 25 | 89.123 | 732.062 | 642.939 | 87.784 | 19.530 | 68.254 | 79.317 | 11.3 | 8.53 |
| 26 | 76.959 | 809.524 | 732.565 | 96.937 | 20.509 | 76.428 | 89.626 | 11.63 | 90.49 |
| 27 | 62.549 | 896.365 | 833.817 | 107.194 | 21.578 | 85.616 | 101.252 | 11.87 | 93.03 |
| 28 | 45.539 | 993.723 | 948.184 | 118.693 | 22.781 | 95.912 | 114.367 | 12.10 | 95.42 |
| 29 | 25.438 | 1102.90 | 107.352 | 131.585 | 24.226 | 107.359 | 129.168 | 12.32 | 97.69 |
| 30 | 1.272 | 1224.530 | 1223.258 | 146.027 | 26.341 | 119.686 | 145.906 | 12.54 | 99.90 |

(1) THESE RATES ARE TREATED AS CONSTANTS; HOWEVER, IF INFLATION INCREASES LENDING RATES ALSO RISE.
(2) THE NET WORTH AND INCOME COLUMNS ARE NET OF LOAN ORIGINATION AND SERVICING COSTS, FEES, TAXES AND DIVIDENDS AT THE STATED RATES.
(3) PRINCIPAL REPAYMENTS ARE PRESUMED TO BE REINVESTED AND THEREFORE ARE EXCLUDED FROM THE CASH FLOW ANALYSIS.

Interest Rate Risk

The actual net income and return on assets would depend on the spread of the loan rate above the cost of funds. The cost of funds in turn depends on the inflation rate. In a fixed rate market with a 10.5% prime rate and less than 4% inflation the spread is quite large and would result in a return on assets of approximately 2.5% if all funds were loaned out at prime.

An acceleration in inflation rates causes financial markets to adjust to higher inflation rates by increasing interest rates. If a surge of inflation were to occur this would work to the intermediary's benefit. Since short-term loan rates are highly sensitive to an acceleration of inflation, revenues should respond immediately whereas the inflation interest cost accrues but is paid out smoothly over time.

Furthermore, the market's response to inflation causes bank loan rates to increase more than the inflation rate. For example, in 1979 when inflation rates peaked out at 13%, prime reached 21% which would have substantially increased the bank's cash flows and after tax spreads. Acceleration of inflation and interest rates insulates the commercial bank from the payment shock of higher money market CD rates and widens the spread.

Generally with high interest rates and tight monetary policy there is a yield curve inversion in which short-term rates exceed long-term rates. This too would open enormous profit opportunities for the commercial intermediary since the inflation-adjusted deposit funds are borrowed long and lent short.

The more significant risk to the commercial intermediary is from a reduction of inflation and interest rates. This, however, presents no special difficulties because the inflation interest is scaled down to the actual inflation rate. From the lending side lower inflation rates do tend to lower interest rates but not quite one for one, as sceptical lenders demand inflation risk premiums against the possibility of renewed future inflation.

If deflation were actually to occur the inflation-adjusted Group IV deposit account still calls for interest payments based on the fixed amortization rate and deflation results in credits which carry forward to offset future inflation interest. While the deposit rate at a minimum is equal to the fixed amortization rate of 3.5%, loan rates should be sufficient to cover the fixed amortization rate.

EXAMPLE III

The Fully-Hedged Program a. Hedging the Interest Rate Risk

It is possible to fully hedge the inflation interest cost by lending funds received by the intermediary in deposit accounts on an inflation-adjusting loan rate basis. An intermediary could, for example, make funds available to coporate borrowers for medium-term corporate needs of between 3 and 10 years. The present invention provides an inflation-adjusting loan account similar in structure to the inflation-adjusted deposit but, preferably, with a shorter maturity.

Again, the lengthy deferrals on the deposit and the shorter repayment schedules on the loan allows the intermediary bank to capitalize on the time value of the more rapid principal repayment on the assets than is needed to service the liabilities. The return on assets is magnified by these deferrals.

Such hedging would eliminate real interest rate risk during the term of the account having the shortest maturity, but would not achieve a "matched" asset and liability balance for the intermediary. This variation of the hedged program is not fully matched because there are dissimilar terms to maturity of the loan accounts as compared to the deposit accounts. Thus, when the term of both accounts are dissimilar, some degree of risk will still be present for the intermediary. This is because upon renewal of the account having the shorter term, a variation in fixed or "real" interest rates may have developed in the market. And potentially, the intermediary could find itself with unbalanced cash flows. The different terms would also leave the intermediary with an unmatched balance sheet. However, it may nevertheless be desirable for intermediaries to hedge inflation-adjusted loan and deposit accounts without fully matching terms because certain intermediaries may be unable to solicit sufficient numbers of long-term loan accounts with adequate underwriting characteristics to satisfy a fully matched program.

b. The Fully Hedged "Matched" Program

It is also possible to exactly match the inflation-adjusting deposit with an inflation-adjusting loan of equal maturity which would totally reduce the financial risk from variable inflation rates and yield curve inversions. In this case, the intermediary would be servicing long-term loans, most likely to finance real estate or other durable plant and equipment. With similar maturities of both the loan and deposit accounts, the intermediary can earn a constant spread over its cost of money with matching deposit and loan contracts. This would fully hedge the real interest rate risk. These loans would also generate substantial front end fees for the intermediary.

Table VI illustrates the effect on the balance sheet and cash flow of an intermediary when the intermediary takes the excess cash flow generated by the matched accounts and reinvests this in new loan accounts with similar terms to the original account. In contrast to Table III, there are generally origination fees associated with such long term loans, which would be equal to the arrangement fees charged by the organizer. It can be observed in Table VI that the total net worth generated by such a fully matched program would be more advantageous to the intermediary than the total net worth generated by a situation such as depicited in Table III, in spite of the fact that receipts by the intermediary would be substantially lower in the initial years than those generated by the partially hedged programs.

Again, in contrast to the situation of a partially hedged program, the exact match between the loan and the deposit account results in identical net cash flow and net income, without the need to rely upon the current tax code in order to generate an additional advantage to the intermediary. The fully matched program will also have in effect a higher initial return on average assets. It should be pointed out that Table VI assumes that the income from the loan accounts flows into the intermediary on a monthly basis and the payments due the deposit account holder must be made on a yearly basis. In this period of time, the intermediary has had the opportunity to invest these funds at the stated float investment rate.

Table VII shows the situation under a fully hedged matched program wherein the loan account and deposit account both have an initial balance of $100 and a term of 30 years. In Table VII, no assumption is made regarding any reinvestment by the intermediary of the income obtained from the loan account. Rather, it demonstrates what the yearly income to the intermediary would be before covering the annual service fee to the organizer under the column titled Spread Retained. Both the loan and deposit accounts have identical values throughout the term of the accounts. These values are shown under the column titled Adjusted Principal. The cash income generated to the intermediary is shown in Table VII under the column titled ABML Payments. This income has two components: the principal payment and the interest payment. The interest payment in turn is split into the portion of interest that is passed through to the deposit account holder and the portion that is retained by the intermediary institution shown under the column titled Spread Retained.

The advantages of such a loan program to the intermediary are futher depicted in Table VII in the remaining column, where in this case an assumption has been made that a property with a market value of $125 is financed by the loan account, and the loan granted by the intermediary represents 80% of the value of such a property. Table VII further makes an assumption that the property increases in value over time in direct proportion to inflation and as a result if such a property generated operating net income before debt service at a rate of 9.5% of its value such operating income would increase over time also in direct proportion to inflation.

The next column of Table VII titled Loan to Value Ratio shows how each year the principal repayment which takes place reduces the loan to value ratio from the initial 80% to levels of 60% by year 11, 40% by year 19, 21% by year 25 and essentially 0 by the end of the 30th year. The debt coverage ratio which is calculated by dividing the net operating income of a property by the payments due for debt service thereon is much higher than that consistently found in such loans by those skilled in the art, with a resulting value of 1.49 in the first year whereas the industry standards usually range between 1.0 and 1.2.

To further emphasize the advantages to the intermediaries, it should be pointed out that this debt coverage ratio of 1.49 is improved in subsequent years to levels of 1.55 by year 14, 1.64 by year 21, 1.75 by year 27, etc. The last column shows that in terms of "constant dollars," the payments made by the borrower to service the loan over time are actually reduced from an initial 7.55 to a level of 6.2 by the 30th year. As the present invention demonstrates, the income paid to the deposit holder maintains a constant purchasing power, and yet in terms of constant purchasing power the stream of payments that must be made by the borrower decreases over time.

Tables VIII and IX show the behavior of the loan to value of ratios and debt coverage ratios over time when the property financed by the loan account cannot maintain its value at the same pace as prices increase. Table VIII presents the case of the property appreciating at a rate of 1% less than the rate of inflation. In this case, the loan to value ratio is also constantly reduced and the debt coverage ratio no longer shows a continuous improvement over time but nevertheless reaches a minimum value of 1.32 in the last year. Yet this is substantially higher than the norm found in the industry. Table IX shows the case where the property fails to keep up with the rate of inflation by 2% per annum. In this case, the loan to value rate will initially show a slight increase and thereafter decreases although at a slower pace. The debt coverage ratio in this case decreases at a faster rate and yet by the 30th year is still higher than 1. This means that the income generated by the property will fully cover the cost of debt service associated with the loan at that time.

TABLE VI

AB DEPOSIT INFORMATION:
INITIAL DEPOSIT: $100
TERM (years): 30
REAL INTEREST RATE: 3.50%
INFLATION RATE (1): 5.00%
TTH ARRANGEMENT FEE:* 2.00%
TTH ANNUAL SERVICE FEE: 1.00%

LOAN INFORMATION
TERM & AMORTIZATION: 30
CONSTANT INTEREST RATE: 2.50%
ORIGINATION FEE: 2.00%
FLOAT INVESTMENT NOMINAL RATE (1): 10.00%
S&L INFORMATION
MARGINAL TAX RATE: 0.00%
DIVIDEND PAYOUT RATIO: 0.00%

| | BALANCE SHEET | | | CASH FLOWS | | | | RATIOS CAPITAL | |
|---|---|---|---|---|---|---|---|---|---|
| YEAR | AB DEPOSIT BALANCE | LOAN BALANCE | NET WORTH (2) | INTEREST INCOME(3) | AB DEPOSIT SERVICE | NET CASH FLOW(3) | NET INCOME (2) | RETURN ON AVG ASSETS | TO ASSET RATIO |
| 0 | $100.000 | $100.000 | | | | | | | |
| 1 | 103.063 | 104.976 | $ 1.913 | 8.351 | 6.437 | $ 1.913 | 1.913 | 1.87% | 1.82% |
| 2 | 106.109 | 110.160 | 4.051 | 8.883 | 6.745 | 2.138 | 2.138 | 1.99 | 3.68 |
| 3 | 109.122 | 115.561 | 6.439 | 9.455 | 7.067 | 2.388 | 2.388 | 2.12 | 5.57 |
| 4 | 112.064 | 121.191 | 9.107 | 10.072 | 7.404 | 2.668 | 2.668 | 2.25 | 7.51 |
| 5 | 114.976 | 127.063 | 12.087 | 10.737 | 7.757 | 2.981 | 2.981 | 2.40 | 9.51 |
| 6 | 111.773 | 133.190 | 15.418 | 11.456 | 8.126 | 3.330 | 3.330 | 2.56 | 11.58 |
| 7 | 120.449 | 139.588 | 19.138 | 12.232 | 8.512 | 3.721 | 3.721 | 2.73 | 13.71 |
| 8 | 122.976 | 146.272 | 23.296 | 13.073 | 8.916 | 4.157 | 4.157 | 2.91 | 15.93 |
| 9 | 125.321 | 153.262 | 27.941 | 13.983 | 9.338 | 4.645 | 4.645 | 3.10 | 18.23 |
| 10 | 127.447 | 160.578 | 33.131 | 14.970 | 9.780 | 5.190 | 5.190 | 3.31 | 20.63 |
| 11 | 129.313 | 168.243 | 38.930 | 16.041 | 10.242 | 5.800 | 5.800 | 3.53 | 23.14 |
| 12 | 130.872 | 176.283 | 45.411 | 17.206 | 10.725 | 6.481 | 6.481 | 3.76 | 25.76 |
| 13 | 132.074 | 184.727 | 52.653 | 18.473 | 11.231 | 7.242 | 7.242 | 4.01 | 28.50 |
| 14 | 132.861 | 193.606 | 60.745 | 19.853 | 11.760 | 8.093 | 8.093 | 4.28 | 31.38 |
| 15 | 133.168 | 202.957 | 69.789 | 21.358 | 12.314 | 9.044 | 9.044 | 4.56 | 34.39 |
| 16 | 132.925 | 212.821 | 79.896 | 23.001 | 12.894 | 10.107 | 10.107 | 4.86 | 37.54 |
| 17 | 132.052 | 223.243 | 91.191 | 24.796 | 13.501 | 11.295 | 11.295 | 5.18 | 40.85 |
| 18 | 130.459 | 234.274 | 103.815 | 26.761 | 14.138 | 12.624 | 12.624 | 5.52 | 44.31 |
| 19 | 128.048 | 245.971 | 117.923 | 28.914 | 14.805 | 14.109 | 14.109 | 5.88 | 47.94 |
| 20 | 124.707 | 58.400 | 133.693 | 31275 | 15.506 | 15.769 | 15.769 | 6.25 | 51.74 |
| 21 | 120.312 | 271.631 | 151.319 | 33.868 | 16.242 | 17.626 | 17.626 | 6.65 | 55.71 |
| 22 | 114.724 | 285.745 | 171.021 | 36.720 | 17.018 | 19.702 | 19.702 | 7.07 | 59.85 |
| 23 | 107.786 | 300.830 | 193.044 | 39.860 | 17.837 | 22.023 | 22.023 | 7.51 | 64.17 |
| 24 | 99.320 | 316.983 | 217.663 | 43.325 | 18.706 | 24.619 | 24.619 | 7.97 | 68.67 |
| 25 | 89.123 | 334.309 | 245.187 | 47.156 | 19.632 | 27.523 | 27.523 | 8.45 | 73.34 |
| 26 | 76.959 | 352.918 | 275.958 | 51.402 | 20.630 | 30.772 | 30.772 | 8.96 | 78.19 |
| 28 | 45.539 | 394.381 | 348.842 | 61.428 | 22.951 | 34.407 | 34.407 | 9.48 | 83.23 |
| 27 | 62.549 | 372.914 | 310.365 | 56.129 | 21.722 | 38.477 | 38.477 | 10.03 | 88.45 |
| 29 | 25.438 | 417.319 | 391.881 | 67.466 | 24.427 | 43.039 | 43.039 | 10.60 | 93.90 |
| 30 | 1.272 | 441.327 | 440.055 | 74.758 | 26.583 | 48.175 | 48.175 | 11.22 | 99.71 |

(1) THESE RATES ARE TREATED AS CONSTANTS; HOWEVER, IF INFLATION INCREASES LENDING RATES ALSO RISE.
(2) THE NET WORTH AND INCOME COLUMNS ARE NET OF LOAN ORIGINATION AND SERVICING COSTS, FEES, TAXES AND DIVIDENDS AT THE STATED RATES.
*THE ARRANGEMENT FEE WOULD EQUAL THE ORIGINATION FEE

TABLE VII

LOAN AMOUNT: $100.00
TERM IN YEARS: 30
INTEREST RATE: 3.50%
ANALYSIS FOR DEPOSITORY INSTITUTION:

BUILDING VALUE: $125.00
INFLATION: 5.00%
APPRECIATION RATE: 5.00%

BUILDING ROR: 9.50%
SPREAD: 2.50%

| YEAR | ABML PMTS | PRINCIPAL PAYMENT | INTEREST PAYMENT | INTEREST PASS-THROUG | SPREAD RETAINED | ADJUSTED PRINCIPAL | BUILDING VALUE | L/V RATIO | DEBT BUILDING INCOME | REAL COVERAGE | PAYMENT |
|---|---|---|---|---|---|---|---|---|---|---|---|
| 0 | | | | | | 100.0000 | 125.0000 | | | | |
| 1 | 7.9371 | 1.9371 | 6.0000 | 3.5000 | 2.5000 | 103.0629 | 131.2500 | 0.7852 | 11.8750 | 1.4961 | 7.5592 |
| 2 | 8.2909 | 2.1072 | 6.1838 | 3.6072 | 2.5766 | 106.1089 | 137.8125 | 0.7700 | 12.4688 | 1.4323 | 1.5201 |
| 3 | 8.6588 | 2.2922 | 6.3665 | 3.7138 | 2.6527 | 109.1221 | 144.7031 | 0.7541 | 13.6922 | 1.4400 | 7.4798 |
| 4 | 9.0410 | 2.4937 | 6.5473 | 3.8193 | 2.7281 | 112.0845 | 151.9383 | 0.7377 | 13.7468 | 1.4481 | 7.4381 |
| 5 | 9.4381 | 2.7130 | 6.7251 | 3.9230 | 2.8021 | 114.9756 | 159.5352 | 0.7207 | 14.4341 | 1.4565 | 7.3950 |
| 6 | 9.8504 | 2.9519 | 6.8985 | 4.1241 | 2.8744 | 117.7725 | 167.5120 | 0.7031 | 15.1558 | 1.4653 | 7.3505 |
| 7 | 10.2783 | 3.2120 | 7.0664 | 4.1220 | 2.9443 | 120.4492 | 175.8876 | 0.6848 | 15.9136 | 1.4745 | 7.3046 |
| 8 | 10.7222 | 3.4953 | 7.2269 | 4.2157 | 3.0112 | 122.9763 | 184.6819 | 0.6659 | 16.7093 | 1.4842 | 7.2572 |
| 9 | 11.1825 | 3.8039 | 7.3786 | 4.3042 | 3.0744 | 125.3212 | 193.9160 | 0.6463 | 17.5448 | 1.4942 | 7.2083 |
| 10 | 11.6595 | 4.1402 | 7.5193 | 4.3862 | 3.1330 | 127.4471 | 203.6118 | 0.6259 | 18.4220 | 1.5048 | 7.1579 |
| 11 | 12.1535 | 4.5067 | 7.6468 | 6.4606 | 3.1862 | 129.3128 | 213.7924 | 0.6049 | 19.3431 | 1.5158 | 7.1059 |

TABLE VII-continued

LOAN AMOUNT: $100.00  BUILDING VALUE: $125.00  BUILDING ROR: 9.50%
TERM IN YEARS: 30  INFLATION: 5.00%  SPREAD: 2.50%
INTEREST RATE: 3.50%  APPRECIATION RATE: 5.00%
ANALYSIS FOR DEPOSITORY INSTITUTION:

| YEAR | ABML PMTS | PRINCIPAL PAYMENT | INTEREST INTEREST PAYMENT | PASS-THROUG | SPREAD RETAINED | ADJUSTED PRINCIPAL | BUILDING VALUE | L/V RATIO | DEBT BUILDING INCOME | REAL COVERAGE | PAYMENT |
|---|---|---|---|---|---|---|---|---|---|---|---|
| 12 | 12.6649 | 4.9062 | 7.7588 | 4.5259 | 3.2328 | 130.8723 | 224.4820 | 0.5830 | 20.3103 | 1.5273 | 7.0523 |
| 13 | 13.1941 | 5.3418 | 7.8523 | 4.5805 | 3.2718 | 132.0741 | 235.7061 | 0.5603 | 21.3258 | 1.5393 | 6.9971 |
| 14 | 13.7414 | 5.8110 | 7.9244 | 6.6226 | 3.3019 | 132.8608 | 247.4914 | 0.5368 | 22.3921 | 1.5519 | 6.9403 |
| 15 | 14.3071 | 6.3354 | 7.9717 | 4.6561 | 3.3215 | 133.1684 | 259.8660 | 0.5125 | 23.5117 | 1.5651 | 6.8820 |
| 16 | 14.8916 | 6.9015 | 7.9901 | 4.6609 | 3.3292 | 132.9254 | 272.8593 | 0.4872 | 24.6873 | 1.5789 | 6.8220 |
| 17 | 15.4952 | 7.5197 | 7.9755 | 4.6524 | 3.3231 | 132.0520 | 286.5023 | 0.466g | 25.9216 | 1.5932 | 6.7605 |
| 18 | 16.1155 | 8.1954 | 7.9231 | 4.6218 | 3.3013 | 130.4592 | 300.8274 | 0.4337 | 27.2177 | 1.6082 | 6.6976 |
| 19 | 16.7619 | 8.9344 | 7.8276 | 4.5661 | 3.2615 | 128.0478 | 315.8688 | 0.4054 | 28.5786 | 1.6238 | 6.6333 |
| 20 | 17.4263 | 9.7434 | 7.6829 | 4.4817 | 3.2012 | 124.7068 | 331.6622 | 0.3760 | 30.6675 | 1.6400 | 6.5678 |
| 21 | 18.1126 | 10.6302 | 7.4824 | 4.3647 | 3.1177 | 120.3120 | 348.2453 | 0.3455 | 31.5079 | 1.6567 | 6.5014 |
| 22 | 18.8223 | 11.6036 | 7.2187 | 4.2109 | 3.6678 | 114.7240 | 365.6576 | 0.3137 | 33.0833 | 1.6740 | 6.4344 |
| 23 | 19.5578 | 12.6743 | 6.8834 | 4.6153 | 2.8681 | 107.7858 | 383.9405 | 0.2807 | 34.7375 | 1.6916 | 6.3674 |
| 24 | 20.3224 | 13.8553 | 6.4672 | 3.7725 | 2.6946 | 99.3198 | 403.1375 | 6.2464 | 36.4743 | 1.7093 | 6.3013 |
| 25 | 21.1222 | 15.1630 | 5.9592 | 3.4762 | 2.4830 | 89.1229 | 423.2944 | 0.2105 | 38.2981 | 1.7268 | 6.2374 |
| 26 | 21.9671 | 16.6198 | 5.3474 | 3.1193 | 2.2281 | 76.9592 | 444.4591 | 0.1732 | 40.2130 | 1.7436 | 6.1781 |
| 27 | 22.8762 | 18.2587 | 4.6176 | 2.6936 | 1.9240 | 62.5485 | 466.6820 | 0.1340 | 42.2236 | 1.7578 | 6.1274 |
| 28 | 23.8894 | 20.1365 | 3.7529 | 2.1892 | 1.5637 | 45.5395 | 490.0161 | 0.0929 | 44.3348 | 1.7675 | 6.0940 |
| 29 | 25.1105 | 22.3781 | 2.7324 | 1.5939 | 1.1385 | 25.4383 | 514.5169 | 0.0494 | 46.5515 | 1.7656 | 6.1005 |
| 30 | 26.9646 | 25.4383 | 1.5263 | 6.8903 | 6.6360 | 1.2719 | 540.2428 | 0.0024 | 48.8791 | 1.7264 | 6.2390 |

TABLE VIII

LOAN AMOUNT: $100.00  BUILDING VALUE: $125.00  BUILDING ROR: 9.50%
TERM IN YEARS: 30  INFLATION: 5.00%  SPREAD: 2.50%
INTEREST RATE: 3.50%  APPRECIATION RATE: 4.00%
ANALYSIS FOR DEPOSITORY INSTITUTION:

| YEAR | ABML PMTS | PRINCIPAL PAYMENT | INTEREST INTEREST PAYMENT | PASS-THROUG | SPREAD RETAINED | ADJUSTED PRINCIPAL | BUILDING VALUE | L/V RATIO | DEBT BUILDING INCOME | REAL COVERAGE | PAYMENT |
|---|---|---|---|---|---|---|---|---|---|---|---|
| 0 |  |  |  |  |  | 100.0000 | 125.0000 |  |  |  |  |
| 1 | 7.9371 | 1.9371 | 6.0000 | 3.5000 | 2.5000 | 103.0629 | 130.0000 | 0.7928 | 11.8750 | 1.4961 | 7.5592 |
| 2 | 8.2909 | 2.1072 | 6.1838 | 3.6072 | 2.5766 | 106.1089 | 135.2000 | 0.7848 | 12.3500 | 1.4323 | 7.5201 |
| 3 | 8.6588 | 3.2922 | 6.3865 | 3.7138 | 2.6527 | 109.1221 | 140.6080 | 0.7761 | 12.8440 | 1.4263 | 7.4798 |
| 4 | 9.0410 | 3.4937 | 6.5473 | 3.8193 | 2.7281 | 112.0845 | 146.2323 | 0.7665 | 13.3578 | 1.4206 | 7.4381 |
| 5 | 9.4381 | 2.7130 | 6.7251 | 3.9230 | 2.8021 | 114.9756 | 152.0816 | 0.7560 | 13.8921 | 1.4153 | 7.3950 |
| 6 | 9.8504 | 2.9519 | 6.8985 | 4.0241 | 2.8144 | 117.7725 | 158.1649 | 0.7446 | 14.4478 | 1.4103 | 7.3505 |
| 7 | 10.2783 | 3.2120 | 7.0664 | 4.1220 | 2.9443 | 120.4492 | 164.4915 | 0.7323 | 15.0257 | 1.4057 | 7.3046 |
| 8 | 10.7222 | 3.4953 | 7.2269 | 4.2151 | 3.0112 | 122.9763 | 171.0711 | 0.7189 | 15.6267 | 1.4014 | 7.2572 |
| 9 | 11.1825 | 3.8039 | 7.3786 | 4.3042 | 3.0744 | 125.3212 | 177.9140 | 0.7044 | 16.2518 | 1.3974 | 7.2063 |
| 10 | 11.6595 | 4.1402 | 7.5193 | 4.3862 | 3.1330 | 127.4471 | 185.0305 | 0.6888 | 16.9018 | 1.3939 | 7.1579 |
| 11 | 12.1535 | 4.5067 | 7.6468 | 4.4606 | 3.1862 | 129.3128 | 192.4318 | 0.6720 | 17.5779 | 1.3907 | 7.1059 |
| 12 | 12.6649 | 4.9062 | 7.7588 | 4.5259 | 3.2328 | 130.8723 | 200.1290 | 0.6539 | 18.2810 | 1.3879 | 7.0523 |
| 13 | 13.1941 | 5.3418 | 7.8523 | 4.5805 | 3.2718 | 132.0741 | 208.1342 | 0.6346 | 19.0123 | 1.3855 | 6.9971 |
| 14 | 13.7414 | 5.8170 | 7.9244 | 4.6226 | 3.3019 | 132.8608 | 216.4596 | 0.6138 | 19.7727 | 1.3836 | 6.9403 |
| 15 | 14.3071 | 6.3354 | 7.9717 | 4.6501 | 3.3215 | 133.1684 | 225.1179 | 0.5915 | 20.5637 | 1.3820 | 6.8820 |
| 16 | 14.8916 | 6.9015 | 7.9901 | 4.6609 | 3.3292 | 132.9254 | 234.1227 | 0.5678 | 21.3862 | 1.3809 | 6.8220 |
| 17 | 15.4952 | 7.5197 | 7.9755 | 4.6524 | 3.3231 | 132.0520 | 243.4876 | 0.5423 | 22.2417 | 1.3802 | 6.7605 |
| 18 | 16.1185 | 8.1954 | 7.9231 | 4.6218 | 3.3013 | 130.4592 | 253.2271 | 0.5152 | 23.1313 | 1.3799 | 6.6976 |
| 19 | 16.7619 | 8.9344 | 7.8276 | 4.5661 | 3.2615 | 128.0478 | 263.3561 | 0.4862 | 24.0566 | 1.3800 | 6.6333 |
| 20 | 17.4263 | 9.7434 | 7.6829 | 4.4817 | 3.2012 | 124.7068 | 273.8904 | 0.4553 | 25.0188 | 1.3805 | 6.5678 |
| 21 | 18.1126 | 10.6302 | 7.4824 | 4.3647 | 3.1177 | 120.3120 | 284.8460 | 0.4224 | 26.0196 | 1.3813 | 6.5014 |
| 22 | 18.8223 | 11.6036 | 7.2187 | 4.2109 | 3.0078 | 114.7240 | 296.2398 | 0.3873 | 27.0604 | 1.3824 | 6.4344 |
| 23 | 19.5578 | 12.6743 | 6.8834 | 4.0153 | 2.8681 | 107.7858 | 308.0894 | 0.3499 | 28.1428 | 1.3836 | 6.3674 |
| 24 | 20.3224 | 13.8553 | 6.4672 | 3.7725 | 2.6946 | 99.3198 | 320.4130 | 0.3100 | 29.2685 | 1.3848 | 6.3013 |
| 25 | 21.1222 | 15.1630 | 5.9592 | 3.4762 | 2.4830 | 89.1229 | 333.2295 | 0.2675 | 30.4392 | 1.3857 | 6.2374 |
| 26 | 21.9671 | 16.6198 | 5.3474 | 3.1193 | 2.2281 | 76.9592 | 346.5587 | 0.2221 | 31.6568 | 1.3857 | 6.1781 |
| 27 | 22.8762 | 18.2587 | 4.6176 | 2.6936 | 1.9240 | 62.5485 | 360.4211 | 0.1735 | 32.9231 | 1.3838 | 6.1274 |
| 28 | 23.8894 | 20.1365 | 3.7529 | 2.1892 | 1.5637 | 45.5395 | 374.8379 | 0.1215 | 34.2400 | 1.3781 | 6.0940 |
| 29 | 25.1105 | 22.3781 | 2.7324 | 1.5939 | 1.1385 | 25.4383 | 389.8314 | 0.0653 | 35.6096 | 1.3636 | 6.1005 |
| 30 | 26.9646 | 25.4383 | 1.5263 | 0.8903 | 0.6360 | 1.2719 | 405.4247 | 0.0031 | 37.0340 | 1.3206 | 6.2390 |

TABLE IX

LOAN AMOUNT: $100.00  BUILDING VALUE: $125.00  BUILDING ROR: 9.50%
TERM IN YEARS: 30  INFLATION: 5.00%  SPREAD: 2.50%
INTEREST RATE: 3.50%  APPRECIATION RATE: 3.00%
ANALYSIS FOR DEPOSITORY INSTITUTION:

| YEAR | ABML PMTS | PRINCIPAL PAYMENT | INTEREST INTEREST PAYMENT | PASS-THROUG | SPREAD RETAINED | ADJUSTED PRINCIPAL | BUILDING VALUE | L/V RATIO | DEBT BUILDING INCOME | REAL COVERAGE | PAYMENT |
|---|---|---|---|---|---|---|---|---|---|---|---|
| 0 | | | | | | 100.0000 | 125.0000 | | | | |
| 1 | 7.9371 | 1.9371 | 6.0000 | 3.5000 | 2.5000 | 103.0629 | 128.7500 | 0.8005 | )1.8150 | :.496: | 7.5592 |
| 2 | 8.2909 | 2.1072 | 6.1838 | 3.6072 | 2.5766 | 106.1089 | 132.6125 | 0.8001 | 12.2313 | 1.4323 | 7.5201 |
| 3 | 8.6588 | 2.2922 | 6.3665 | 3.7138 | 2.6527 | 109.1221 | 136.5909 | 0.7989 | 12.5982 | 1.4126 | 7.4798 |
| 4 | 9.0410 | 2.4937 | 6.5473 | 3.8193 | 2.7281 | 112.0845 | 140.6886 | 0.7967 | 12.9761 | 1.3934 | 7.4381 |
| 5 | 9.4381 | 2.7130 | 6.7251 | 3.9230 | 2.8021 | 114.9756 | 144.9093 | 0.7934 | 13.3654 | 1.3749 | 7.3950 |
| 6 | 9.8504 | 2.9519 | 6.8985 | 4.0241 | 2.8744 | 117.7725 | 149.2565 | 0.7891 | 13.7664 | 1.3568 | 7.3505 |
| 7 | 10.2783 | 3.2120 | 7.0664 | 4.1220 | 2.9443 | 120.4492 | 153.7342 | 0.7835 | 14.1794 | 1.3394 | 7.3046 |
| 8 | 10.7222 | 3.4953 | 7.2269 | 4.2157 | 3.0112 | 122.9763 | 158.3463 | 0.7766 | 14.6048 | 1.3224 | 7.2512 |
| 9 | 11.1825 | 3.8039 | 7.3786 | 4.3042 | 3.0744 | 125.3212 | 163.0966 | 0.7684 | - 15.0429 | 1.3060 | 7.2083 |
| 10 | 11.6595 | 4.1402 | 7.5193 | 4.3862 | 3.1330 | 127.4471 | 167.9895 | 0.7587 | 15.4942 | 1.2902 | 7.1579 |
| 11 | 12.1535 | 4.5067 | 7.6468 | 4.4606 | 3.1862 | 129.3128 | 173.0292 | 0.7473 | 15.9590 | 1.2749 | 7.1059 |
| )2 | 12.6649 | 4.9062 | 7.7588 | 4.5259 | 3.2328 | 130.8723 | 178.2201 | 0.7343 | 16.4378 | 1.2601 | 7.0523 |
| 13 | 13.1941 | 5.3418 | 7.8523 | 4.5805 | 3.2118 | 132.0741 | 183.5667 | 0.7195 | )6.9309 | 1.2458 | 6.9911 |
| 14 | 13.7414 | 5.8170 | 7.9244 | 4.6226 | 3.3019 | 132.8608 | 189.0737 | 0.7027 | 17.4388 | 1.2321 | 6.9403 |
| 15 | 14.3071 | 6.3354 | 7.9717 | 4.6501 | 3.3215 | 133.1684 | 194.7459 | 0.6838 | 17.9620 | 1.2189 | 6.8820 |
| 16 | 14.8916 | 6.9015 | 7.9901 | 4.6609 | 3.3292 | 132.9254 | 200.5883 | 0.6627 | 18.5009 | 1.2062 | 6.8220 |
| 17 | 15.4952 | 7.5197 | 7.9755 | 4.6524 | 3.3231 | 132.0520 | 206.6060 | 0.6391 | 19.0559 | 1.1940 | 6.7605 |
| 18 | 16.1185 | 8.1954 | 7.9231 | 4.6218 | 3.3013 | 130.4592 | 212.8041 | 0.6130 | 19.6276 | 1.1822 | 6.6976 |
| 19 | 16.7619 | 8.9344 | 7.8276 | 4.5661 | 3.2615 | 128.0478 | 219.1883 | 0.5842 | 20.2164 | 1.1710 | 6.6333 |
| 20 | 17.4263 | 9.7434 | 7,6829 | 4.4817 | 3.2012 | 124.7068 | 225.7639 | 0.5524 | 20.8229 | 1.1601 | 6.5678 |
| 21 | 18.1126 | 10.63a2 | 7.4824 | 4.3647 | 3.1177 | 120.3120 | 232.5368 | 0.5174 | 21.4476 | 1.1696 | 6.5014 |
| 22 | 18.8223 | 11.6036 | 7.2187 | 4.2109 | 3.0078 | 114.7240 | 239.5129 | 0.4790 | 22.0910 | 1.1395 | 6.4344 |
| 23 | 19.5578 | 12.6743 | 6.8834 | 4.0153 | 2.8681 | 101.7858 | 246.6983 | 0.4369 | 22.7537 | 1.1295 | 6.3674 |
| 24 | 20.3224 | 13.8553 | 6.4672 | 3.7725 | 2.6946 | 99.3198 | 254.0993 | 0.39()9 | 23.4363 | 1.1196 | 6.3013 |
| 25 | 21.1222 | 15.1630 | 5.9592 | 3.4762 | 2.4830 | 89.1229 | 261.7222 | 0.3405 | 24.1394 | 1.1096 | 6.2374 |
| 26 | 21.9671 | 16.6198 | 5.3474 | 3.1193 | 2.2281 | 76.9592 | 269.5739 | 0.2855 | 24.8636 | 1.0989 | 6.1781 |
| 27 | 22.8762 | 18.2587 | 4.6176 | 2.6936 | 1.9240 | 62.5485 | 277.6611 | 0.2253 | 25.6095 | 1.0869 | 6.1274 |
| 28 | 23.8894 | 20.1365 | 3.7529 | 2.1892 | 1.5637 | 45.5395 | 285.9910 | 0.1592 | 26.3778 | 1.0720 | 6.0940 |
| 29 | 25.1105 | 22.3781 | 2.7324 | 1.5939 | 1.1385 | 25.4383 | 294.5707 | 0.0664 | 27.1691 | 1.0505 | 6.1005 |
| 30 | 26.9446 | 25.4363 | 1.5263 | 0.8903 | 0.6360 | 1.2719 | 303.4078 | 0.0042 | 27.9862 | 1.0076 | 6.2390 |

While matching will reduce the interest rate exposure of the intermediary it will not increase credit risk. In fact, because the borrower's debt service on an inflation-adjusting loan with a 300 basis point markup is quite modest at 8.25 per $100, there is substantial debt coverage.

This option is especially attactive to intermediaries that undertake interim construction loans on real estate because the long-term inflation-adjusting deposit accounts with its potential to finance a long-term inflation-adjusting Mortgage loans would provide permanent takeout money for the intermediary. This would be true either by design or necessity. In this case the intermediary enters a fully matched-book program on a long-term rather than a short-term basis.

In order to maintain the longevity of the match, the deposit and loan account would provide for substantial penalties for early withdrawal and corresondingly, the loan account would carry a substantial prepayment penalty. These penalties do not significantly detract from the appeal of both the deposit and loan accounts.

The foregoing invention has been described in terms of preferred embodiments. However, those of skill in the art will recognize that many variations of such embodiments exist. Such variations are intended to be within the scope of the present invention and the appended claims.

We claim:

1. An investment system for providing an improved capital structure for an institution comprising:
   means for establishing data representative of at least one deposit account for a term, the deposit account having a deposit principal component and a deposit accrual component, the deposit accrual component having a fixed interest component and a variable interest component; and
   an account management data processor for servicing the deposit account over the term, including:
      means for determining the rate of inflation;
      means for adjusting the amount in the deposit accrual component in a manner responsive to the rate of inflation;
      means for retiring the fixed interest component by a first schedule over the term; and
      means for paying the deposit principal component according to a second schedule over the term.

2. The system of claim 1, the account management dataprocessor further including means for retiring the variable interest component by a third schedule over the term.

3. The system of claim 2, wherein said first, second and third schedules are the same schedule.

4. The system of claim 1, wherein the deposit principal component paying means comprises means for making a lump sum payment at the end of the term.

5. The system of claim 1 further comprising:
   means for establishing data representative of at least one loan account for a term, the loan account having a loan principal component and a loan accrual component; and
   the account management dataprocessor further including means for determining the amount in the loan accrual component in a manner responsive to the rate of inflation; and means for retiring the loan account over the term.

6. The system of claim 5 wherein the loan account retiring means comprises means for retiring the loan accrual component by a first schedule over the term and further comprises means for retiring the loan principal component by a second schedule over the term.

7. The system of claim 5, the account management dataprocessor further comprising means for enhancing the loan principal component responsive to the loan accrual component and wherein the loan account retiring means comprises means for retiring the principal component by a schedule over the term.

8. The system of claim 5 wherein the loan accrual component comprises a fixed interest component and a variable interest component.

9. The system of claim 8, the account management data processor further comprising:
means for enhancing the loan principal component in a manner responsive to the variable interest component; and
wherein the loan account retiring means comprises:
means for retiring the fixed interest component by a first schedule over the term; and
means for retiring the loan principal component by a second schedule over the term.

10. The system of claim 8, the account management dataprocessor further comprising:
means for enhancing the loan principal component in a manner responsive to the variable interest component; and
wherein the loan account retiring means comprises:
means for retiring the fixed interest component by a first schedule over the term; and
means for retiring the loan principal component by amortization over the term.

11. The system of claim 10 wherein the means for retiring the fixed interest component by a first schedule over the term comprises means for reducing the amount in the fixed interest component by a predetermined portion at preselected iteration periods.

12. The system of claim 11 wherein the means for retiring the loan principal component by amortization comprises means for retiring a portion of the loan principal as determined by the formula:

$$R = \frac{A}{PVIF}$$

wherein R=the portion retired;
A=the amount of the deposit principal; and
PVIF is defined as $$\sum_{I=1}^{N} \left( \frac{1}{(1+i)^I} \right)$$

wherein N is the number of iteration periods remaining +1, and i is a fixed interest rate.

13. The system of claim 12, wherein the amortization comprises a lump sum payment at the end of the term.

14. The system of claim 5 wherein the loan account is a mortgage account.

15. The system of claim 5 wherein the means for adjusting the amount in the loan accrual component in a manner responsive to the rate of inflation comprises means for multiplying the loan principal component by the rate of inflation when said rate reflects a positive rate of inflation.

16. The system of claim 1 wherein the means for determining the rate of inflation comprises a consumer price indexing means.

17. The system of claim 1 wherein the deposit account is a certificate of deposit account, bond account or annuity account.

18. The system of claim 1, the account management dataprocessor further including means for enhancing the deposit principal component in a manner responsive to the variable interest component by multiplying the deposit principal component by a variable interest rate and adding at least a predetermined portion of their product to the deposit principal component.

19. The system of claim 1 wherein the means for adjusting the amount in the deposit accrual component in a manner responsive to the rate of inflation comprises means for multiplying the deposit principal component by the rate of inflation when said rate reflects a positive rate of inflation.

20. The system of claim 1 wherein the means for retiring the fixed interest component by a first schedule over the term comprises means for reducing the amount in the fixed interest component by a predetermined portion at preselected iteration periods.

21. The system of claim 20 wherein the means for paying the deposit principal component according to a second schedule comprises means for paying a portion of the deposit principal by amortization as determined by the formula:

$$R = \frac{A}{PVIF}$$

wherein R=the portion paid;
A=the amount of the deposit principal; and
PVIF is defined as $$\sum_{I=1}^{N} \left( \frac{1}{(1+i)^I} \right)$$

22. The system of claim 21, wherein the amortization comprises a lump sum payment at the end of the term.

23. The system of claim 1, wherein the means for adjusting the amount in the deposit accrual component in a manner responsive to the rate of inflation comprises means for multiplying the deposit principal component by the rate of inflation when said rate reflects a positive rate of inflation.

24. In combination, in an investment system for managing inflation risk:
means for establishing data representative of a deposit account with an institution, the deposit account having a principal component representing the cash investment of a depositor for an account term, and an accrual component comprising a fixed interest component which is enhanced at a fixed interest rate times the principal component and a variable interest component which is enhanced at an index responsive to the rate of inflation times the principal component; and
an account management dataprocessor including means for paying the deposit account over the term.

25. The combination of claim 24, the account term being divided into a plurality of iteration periods.

26. The combination of claim 25, the fixed interest component for the current iteration period being enhanced additionally at a fixed interest rate times the accrual component for the previous iteration period.

27. The combination of claim 25, the variable interest component for the current iteration period being enhanced at an index responsive to the rate of inflation of the accrual component for the previous iteration period.

28. The combination of claim 25, the fixed interest rate being compounded continuously.

29. The combination of claim 24, wherein the deposit account comprises a bond account, a certificate of deposit account, or an annuity account.

30. The combination of claim 24, the principal component being constant over the account term and retired at the end of the account term by a lump sum payment to the depositor.

31. The combination of claim 24, the principal component being retired over a plurality of iteration periods in the account term by payments to the depositor in each iteration period.

32. The combination of claim 24, the accrual component being retired over a plurality of iteration periods in the account term by payment to the depositor in each iteration period.

33. The combination of claim 24, the index corresponding generally to the consumer price index.

34. The combination of claim 24, the deposit account being used to finance property of the institution.

35. The combination of claim 24, the deposit account being secured by property of the institution.

36. A system for managing deposit and loan accounts, comprising:

means for establishing data representative of at least one deposit account for a term;

means for establishing data representative of at least one loan account for a term, the loan account having a loan principal component and a loan accrual component, the loan accrual component having a fixed interest component and variable and variable interest component; and an account management dataprocessor for servicing the accounts over the term, comprising:

means for adjusting the amount in the deposit account in a manner responsive to the rate of inflation;

means for paying out the deposit account;

means for determining the amount in the loan accrual component in a manner responsive to the rate of inflation; and means for retiring the loan account over the term, including means for retiring the fixed interest component by a first schedule over the term, and means for retiring the loan principal component by a second schedule over the term.

37. The system of claim 36, the account management dataprocessor further comprising means for retiring the loan variable interest component by a third schedule over the term.

38. The system of claim 37, wherein said first, second, and third schedules are the same schedule.

39. The system of claim 36, wherein the means for retiring the loan account permits prepayment of the loan account.

40. The system of claim 36, the account management dataprocessor further comprising means for enhancing the loan principal component in a manner responsive to the variable interest component by multiplying the loan principal component by a variable interest rate and adding at least a predetermined portion of their product to the loan principal component.

41. The system of claim 36, wherein the means for determining the rate of inflation comprises a consumer price indexing means.

42. The system of claim 36, wherein the deposit account is a certificate of deposit account, bond account, or annuity account.

43. The system of claim 36, wherein the loan account is a mortgage account.

44. The system of claim 36, the deposit account having a deposit principal component and a deposit accrual component wherein the means for paying out the deposit account includes means for paying out the deposit principal component by a schedule over the term and means for paying out the deposit accrual component by a schedule over the term.

* * * * *

UNITED STATES PATENT AND TRADEMARK OFFICE
CERTIFICATE OF CORRECTION

PATENT NO. : 5,832,461
DATED : November 3, 1998
INVENTOR(S) : Leon et al.

It is certified that error appears in the above-identified patent and that said Letters Patent is hereby corrected as shown below:

In claim 36, column 29, line 33, change "and variable and variable" to --and a variable--.

Signed and Sealed this

Twenty-sixth Day of September, 2000

Attest:

Q. TODD DICKINSON

Attesting Officer

Director of Patents and Trademarks

(12) EX PARTE REEXAMINATION CERTIFICATE (6773rd)
United States Patent
Leon et al.

(10) Number: US 5,832,461 C1
(45) Certificate Issued: Apr. 21, 2009

(54) SYSTEM AND METHOD OF INVESTMENT MANAGEMENT INCLUDING MEANS TO ADJUST DEPOSIT AND LOAN ACCOUNTS FOR INFLATION

(75) Inventors: Thomas Leon, Austin, TX (US); Lewis J. Spellman, Austin, TX (US)

(73) Assignee: Trans Texas Holdings Corporation, Austin, TX (US)

Reexamination Request:
No. 90/005,841, Oct. 6, 2000

Reexamination Certificate for:
Patent No.: 5,832,461
Issued: Nov. 3, 1998
Appl. No.: 07/780,834
Filed: Oct. 23, 1991

Certificate of Correction issued Sep. 26, 2000.

Related U.S. Application Data

(63) Continuation of application No. 07/187,054, filed on Apr. 27, 1988, now abandoned, which is a continuation of application No. 06/770,493, filed on Aug. 27, 1985, now Pat. No. 4,742,457.

(51) Int. Cl.
*G06F 17/00* (2006.01)

(52) U.S. Cl. .......................................... 705/38; 705/35
(58) Field of Classification Search .................. None
See application file for complete search history.

(56) References Cited

U.S. PATENT DOCUMENTS

| | | | |
|---|---|---|---|
| 4,194,242 A | 3/1980 | Robbins | 364/200 |
| 4,232,367 A | 11/1980 | Youden et al. | 364/408 |
| 4,321,672 A | 3/1982 | Braun et al. | 364/408 |
| 4,774,663 A * | 9/1988 | Musmanno et al. | 705/36 |
| 4,799,156 A | 1/1989 | Shavit et al. | 364/401 |

OTHER PUBLICATIONS

Weiner, G., "Choosing a Home Equity Plan," Restaurant Business, vol. 84 No. 100 (2) reprinted, Feb. 1985.*
Markman claim construction, *Trans Texas Holdings Corporation v. Pimco Advisors, L.P., and Pimco Funds*, U.S. District Court for the Western District of Texas, Austin Division, No. A 99 CA 658 SS, May 26, 2000.
Arak et al., "The Real Rate of Interest: Inferences from the New U.K. Indexed Gilts," Internat'l Economic Rev. 26(2):399–408 (1985).
Arida et al., "Inertial Inflation and Monetary Reform: Brazil," in Inflation and Indexation: Argentina, Brazil, and Israel, Williamson (ed.), MIT Press, Cambridge (1985).
*Aztec Properties, Inc. v. Union Planters National Bank of Memphis*, 530 S.W.2d 756 (Tenn. 1975).
Bach et al., "A Stable Purchasing Power Bond," American Economic Rev. XXXI(4):823–825 (1941).

(Continued)

*Primary Examiner*—Matthew C. Graham

(57) ABSTRACT

Data processing for novel form of relationship management links, supervises, and balances depositors, marketing agents, financial intermediaries, mortgage brokers, and borrowers in an inflation-adjusted financing program. Funds are deposited in participating financial institutions in return for certificates of deposit yielding a fixed rate of interest, plus principal growth at a yearly rate equal to that year's rate of growth in the Consumer Price Index-All Urban Consumers, All Items. Funds on deposit are loaned to borrower, either directly or through brokers, at a rate calculated by adding three components: a fixed debt service rate, a fixed constant interest rate, and an inflation factor interest rate which reflects the effects of inflation on the outstanding loan balance. Organizing company sychronizes entire program by contacting depositors through marketing agent, designating institutions to receive depositors' funds, contacting borrowers directly or through brokers, and by supplying data processing capabilities to financial intermediaries for purposes of impletation of the program and for analysis of the effects of the program on the intermediaries' capital structures.

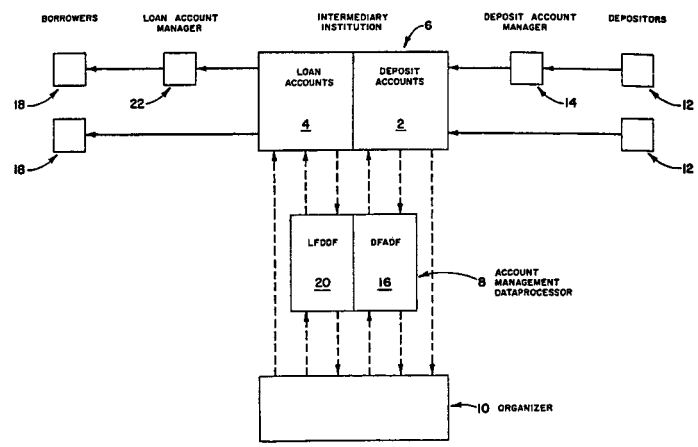

OTHER PUBLICATIONS

Baer et al., "The Trouble with Index–Linking: Reflections on the Recent Brazilian Experience," World Development 8:677–703 (1980).

Bank of England Press Notices, Jul. 3, 1981, Dec. 18, 1981, Jun. 18, 1982, Dec. 17, 1982, Jun. 17, 1983, and Dec. 16, 1983.

Binder, "Indexing the Economy Through Financial Intermediation," Research Memo No. 196, Princeton University Econometric Research Program (1976).

Bodie, "An Innovation for Stable Real Retirement Income," Fall 1980 J. Portfolio Mgmt. 5–13.

Bootle, Index–Linked Gilts, $2^{nd}$ ed., Woodhead–Faulkner, New York (1991) ($1^{st}$ ed. published 1985).

Cohn et al., "Alternative Mortgage Designs," in the Proceedings of a Conference on New Mortgage Designs for Stable Housing in an Inflationary Environment, held in Cambridge, MA, Jan. 1975.

Committee to Review the Functioning of Financial Institutions, Report to Parliament, Chapters 5 and 7 (Jun. 1980).

Fischer, "On the Nonexistence of Privately Issued Index Bonds in the U.S. Capital Market," in Inflation, Debt, and Indexation, Dornbusch and Simonsen (eds.), The MIT Press, Cambridge, MA (1983).

Fisher, "Adjusting Wages to the Cost of Living," Monthly Labor Rev. VII(5):1151–1155 (1918).

Fischer, "The Demand for Index Bonds," J. Political Econ. 83(3):509–534 (1975).

Fisher, "The Tabular Standard in Massachusetts History," Quarterly J. Econ. XXVII:417–454 (1913).

Fisher, The Money Illusion, Adelphi, New York (1928).

Fisher, The Purchasing Power of Money, MacMillan Co., New York (1926), pp. 208–209.

Goode, "A Constant–Purchasing–Power Savings Bond," Nat'l Tax J. IV(4):332–340 (1951).

*Guaranty Trust Co., Trustee* v. *Henwood, Trustee, et al.,* 307 U.S. 247, 59 S.Ct. 847, 83 L.Ed. 1266 (1939).

Huberman et al., "Information–Aggregation, Inflation, and the Pricing of Indexed Bonds," J. Political Econ. 93(1):92–114 (1985).

Jud, Inflation and the Use of Indexing in Developing Countries, Praeger Special Studies, New York (1978).

Kouri, "Finland," in Inflation and Indexation: Argentina, Brazil, and Israel, Williamson (ed.), MIT Press, Cambridge, MA (1985).

Marshall, "Remedies for Fluctuations of General Prices" (1887) *reprinted in* Memorials of Alfred Marshall, Pigou (ed.), Kelley & Millman, New York, 1956.

McCulloch, "Measuring the Term Structure of Interest Rates," J. Business 44:19–31 (1971).

McCullouch, "The Ban on Indexed Bonds, 1933–77," Amer. Economic Rev. 70(5):1018–1021 (1980).

Mukherjee et al., Indexation in an Inflationary Economy, A Case Study of Finland, Chapters VI–X, vol. XL, Broadsheet No. 551, pp. 50–110 (1976).

Pyle, "On the Theory of Financial Intermediation," J. Finance XXVI(3):737–747 (1971).

Rutterford, "Index–Linked Gilts," no information provided to identify the source of this article (believed to be published in 1983).

Schaefer, "Measuring a Tax–Specific Term Structure of Interest Rates in the Market for British Government Securities," Economic J. 91:415–438 (1981).

Tobin, An Essay on Principles of Debt Management, Cowles Foundation for Research in Economics at Yale University, New Haven, CT (1963).

Treasury of the British Government, "Indexed Gilts," Economic Progress Report No. 133 (1981).

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–44 are cancelled.

* * * * *